United States Patent
Dooley et al.

(10) Patent No.: US 8,632,376 B2
(45) Date of Patent: Jan. 21, 2014

(54) ROBOTIC GAME SYSTEMS AND METHODS

(75) Inventors: Michael Dooley, Pasadena, CA (US); Nikolai Romanov, Oak Park, CA (US); Paolo Pirjanian, Glendale, CA (US); Lihu Chiu, Arcadia, CA (US); Enrico Di Bernardo, Glendora, CA (US)

(73) Assignee: IRobot Corporation, Bedford, MA (US)

( * ) Notice: Subject to any disclaimer, the term of this patent is extended or adjusted under 35 U.S.C. 154(b) by 1215 days.

(21) Appl. No.: 12/234,565

(22) Filed: Sep. 19, 2008

(65) Prior Publication Data

US 2009/0081923 A1    Mar. 26, 2009

Related U.S. Application Data

(60) Provisional application No. 60/994,650, filed on Sep. 20, 2007.

(51) Int. Cl.
*A63H 30/04* (2006.01)
*A63F 13/00* (2006.01)
*A63H 17/00* (2006.01)

(52) U.S. Cl.
USPC ............................. 446/456; 446/465; 463/39

(58) Field of Classification Search
USPC ............... 463/6–7, 30–34, 36–37, 42–43, 47, 463/58–69; 273/237, 246, 317.1, 359, 273/366–368, 440.1, 441–446, 454–455, 273/460–461; 307/43; 318/568.11, 568.12, 318/568.2; 398/FOR. 135; 434/29, 61–71; 439/504, 950; 446/7, 448, 456; 472/86, 472/95, 130; 483/901; 700/245–264, 900; 901/1, 6, 8
IPC ....................................................... A63F 13/00
See application file for complete search history.

(56) References Cited

U.S. PATENT DOCUMENTS 4,398,720 A    8/1983    Jones et al.
4,710,020 A    12/1987    Maddox et al.

(Continued)

FOREIGN PATENT DOCUMENTS

DE    4338841 A1    5/1995
EP    0 294101 A    12/1988

(Continued)

OTHER PUBLICATIONS

International Search Report dated Mar. 18, 2009 and Written Opinion for Application Serial No. PCT/US208/010951, 13 pages.

(Continued)

*Primary Examiner* — Arthur O. Hall
*Assistant Examiner* — Jeffrey Wong
(74) *Attorney, Agent, or Firm* — Knobbe, Martens, Olson & Bear LLP

(57) ABSTRACT

A vehicle chase game includes a first game object and a second game object. A second game object scans for a projected spot on an overhead surface. The second game object detects the projected spot on the overhead surface and gathers location information based on the detected projected spot. The second game object generates a position of a first game object based on the location information. The second game object transfers the position of the first game object to the chase game application program. The chase game application program selects a behavior based on the position of the first game object, where a goal of the behavior is to drive the second game object to intercept the first game object. The chase game application program sends instructions to the second game object's mechanical and electrical systems to execute the selected behaviors.

13 Claims, 13 Drawing Sheets

(56) References Cited

U.S. PATENT DOCUMENTS

| | | | |
|---|---|---|---|
| 4,729,563 A | 3/1988 | Yokoi | |
| 4,846,297 A | 7/1989 | Field et al. | |
| 5,002,501 A | 3/1991 | Tucker | |
| 5,155,684 A | 10/1992 | Burke et al. | |
| 5,203,733 A * | 4/1993 | Patch et al. | 446/444 |
| 5,258,822 A | 11/1993 | Nakamura et al. | |
| 5,367,458 A * | 11/1994 | Roberts et al. | 701/25 |
| 5,393,970 A | 2/1995 | Shau et al. | |
| 5,723,855 A | 3/1998 | Oh et al. | |
| 5,766,077 A | 6/1998 | Hongo | |
| 5,844,232 A | 12/1998 | Pezant | |
| 5,940,170 A | 8/1999 | Berg et al. | |
| 6,059,657 A * | 5/2000 | Oh et al. | 463/6 |
| 6,278,917 B1 | 8/2001 | Bauer et al. | |
| 6,389,329 B1 | 5/2002 | Colens | |
| 6,439,956 B1 | 8/2002 | Ho | |
| 6,459,955 B1 | 10/2002 | Bartsch et al. | |
| 6,483,939 B2 * | 11/2002 | Ochi et al. | 382/154 |
| 6,496,754 B2 * | 12/2002 | Song et al. | 700/245 |
| 6,504,610 B1 | 1/2003 | Bauer et al. | |
| 6,584,376 B1 | 6/2003 | Van Kommer | |
| 6,629,028 B2 | 9/2003 | Paromtchik et al. | |
| 6,654,482 B1 | 11/2003 | Parent et al. | |
| 6,780,077 B2 | 8/2004 | Baumgartner et al. | |
| 6,906,702 B1 | 6/2005 | Tanaka et al. | |
| 6,924,815 B2 * | 8/2005 | Akazawa et al. | 345/582 |
| 7,069,124 B1 | 6/2006 | Whittaker et al. | |
| 7,075,661 B2 | 7/2006 | Petty et al. | |
| 7,147,535 B2 | 12/2006 | Simeray | |
| 7,217,192 B2 | 5/2007 | Nishiyama | |
| 7,720,554 B2 | 5/2010 | DiBernardo et al. | |
| 7,843,429 B2 * | 11/2010 | Pryor | 345/158 |
| 7,996,097 B2 | 8/2011 | Dibernardo et al. | |
| 8,295,955 B2 | 10/2012 | Dibernardo et al. | |
| 2001/0013929 A1 | 8/2001 | Torsten | |
| 2002/0016649 A1 | 2/2002 | Jones | |
| 2002/0104963 A1 | 8/2002 | Mancevski | |
| 2002/0107069 A1 | 8/2002 | Ishino | |
| 2002/0159051 A1 | 10/2002 | Guo | |
| 2002/0169013 A1 | 11/2002 | Serizawa et al. | |
| 2003/0058262 A1 | 3/2003 | Sato et al. | |
| 2003/0193657 A1 | 10/2003 | Uomori et al. | |
| 2003/0208304 A1 | 11/2003 | Peless et al. | |
| 2003/0232649 A1 * | 12/2003 | Gizis et al. | 463/40 |
| 2003/0233870 A1 | 12/2003 | Mancevski | |
| 2004/0125461 A1 | 7/2004 | Kawamura | |
| 2005/0000543 A1 | 1/2005 | Taylor et al. | |
| 2005/0010330 A1 | 1/2005 | Abramson et al. | |
| 2005/0033124 A1 | 2/2005 | Kelly et al. | |
| 2005/0213109 A1 | 9/2005 | Schell et al. | |
| 2007/0045018 A1 | 3/2007 | Carter et al. | |
| 2008/0057828 A1 | 3/2008 | Bowen et al. | |
| 2009/0005167 A1 * | 1/2009 | Arrasvuori et al. | 463/40 |
| 2011/0125323 A1 | 5/2011 | Gutmann et al. | |

FOREIGN PATENT DOCUMENTS

| | | |
|---|---|---|
| EP | 0 479273 A | 4/1992 |
| EP | 0 798 567 | 10/1997 |
| FR | 2601443 A | 1/1998 |
| GB | 2284957 A | 6/1995 |
| JP | 59-112311 | 6/1984 |
| JP | 59184917 A | 10/1984 |
| JP | 60089213 A | 5/1985 |
| JP | 5-257527 | 10/1993 |
| JP | 05257527 A | 10/1993 |
| JP | 05285861 A1 | 11/1993 |
| JP | 10-27018 | 1/1998 |
| JP | 2011-522079 | 11/2001 |
| JP | 2002-82720 | 3/2002 |
| JP | 2003-515210 | 4/2003 |
| WO | WO 99/23543 | 5/1999 |
| WO | WO 01/37060 | 5/2001 |
| WO | WO 2006/056231 A1 | 6/2006 |

OTHER PUBLICATIONS

Becker, C.; Salas, J.; Tokusei, K.; Latombe, J.-C.; "Reliable Navigation Using Landmarks," *Robotics and Automation*, 1995. Proceedings., 1995 IEEE International Conference on Robotics and Automation vol. 1, May 21-27, 1995 pp. 401-406 vol. 1.

International Search Report for PCT/US05/010200, dated Aug. 2, 2005, 3 pages.

International Search Report for PCT/US05/010244, dated Aug. 2, 2005, 3 pages.

Japanese Office Action, JP Patent Application No. 2007-506413, dated May 26, 2010, English Translation and Japanese Office Action.

\* cited by examiner

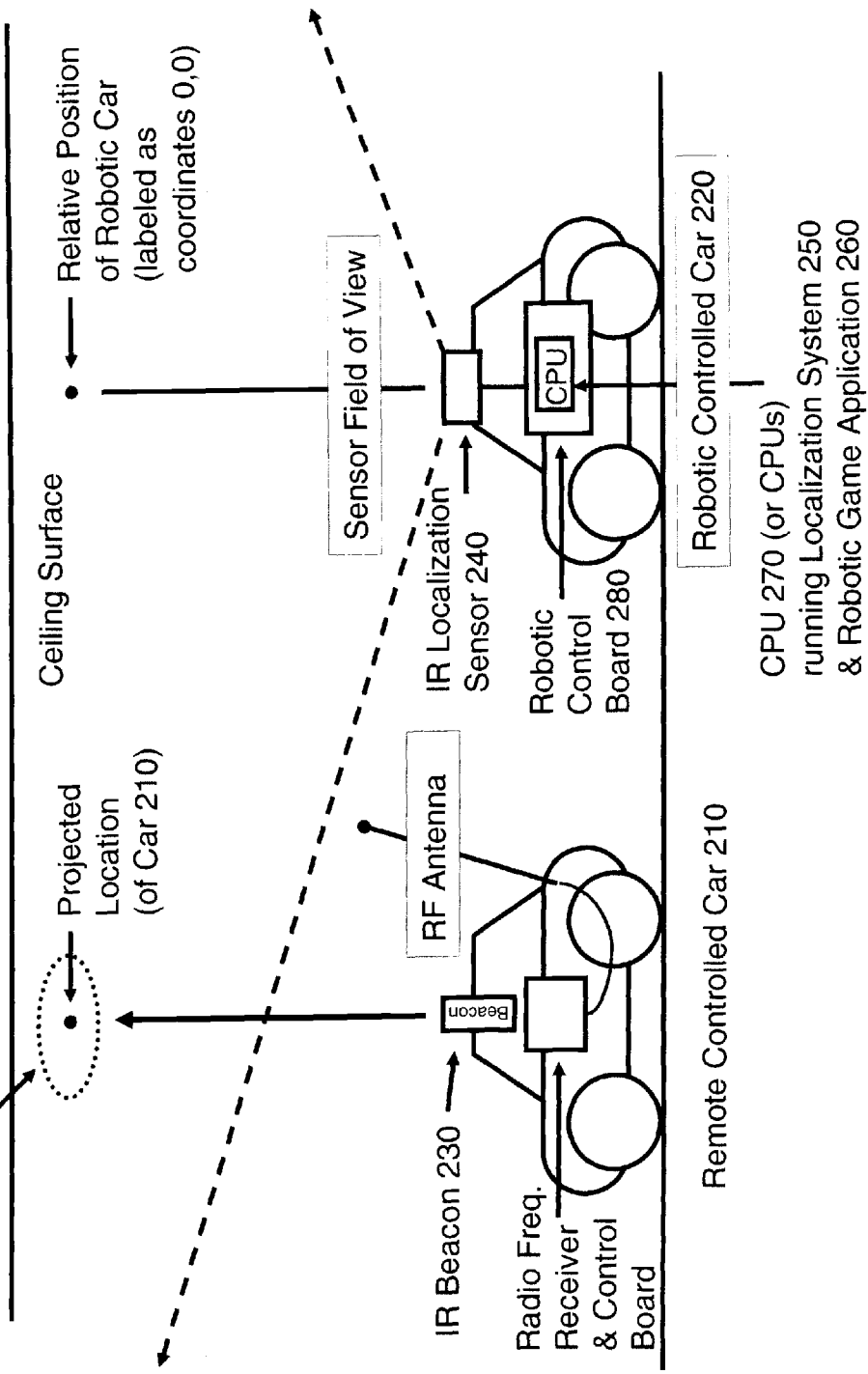
FIGURE 4A: Indoor Chasing

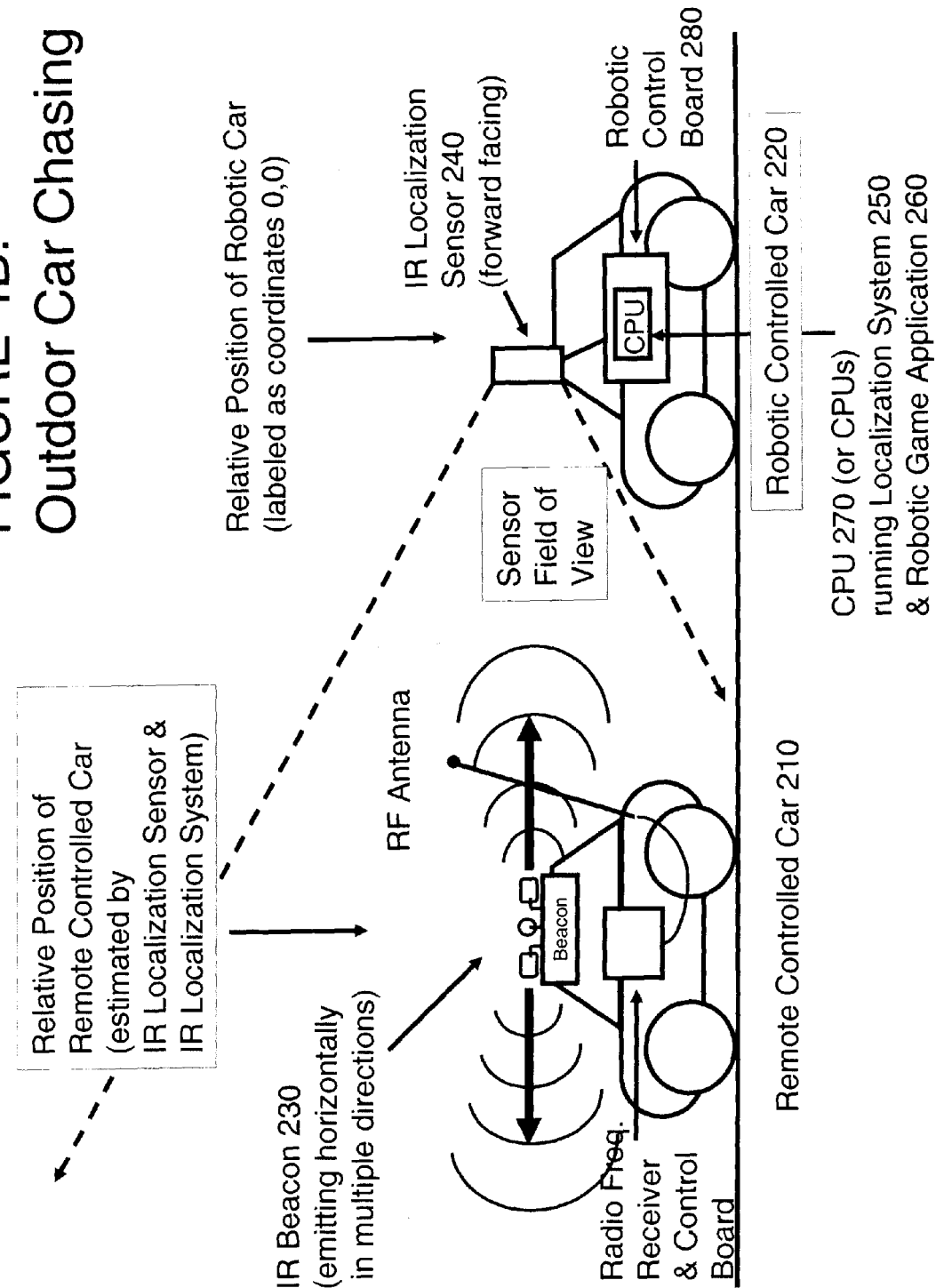

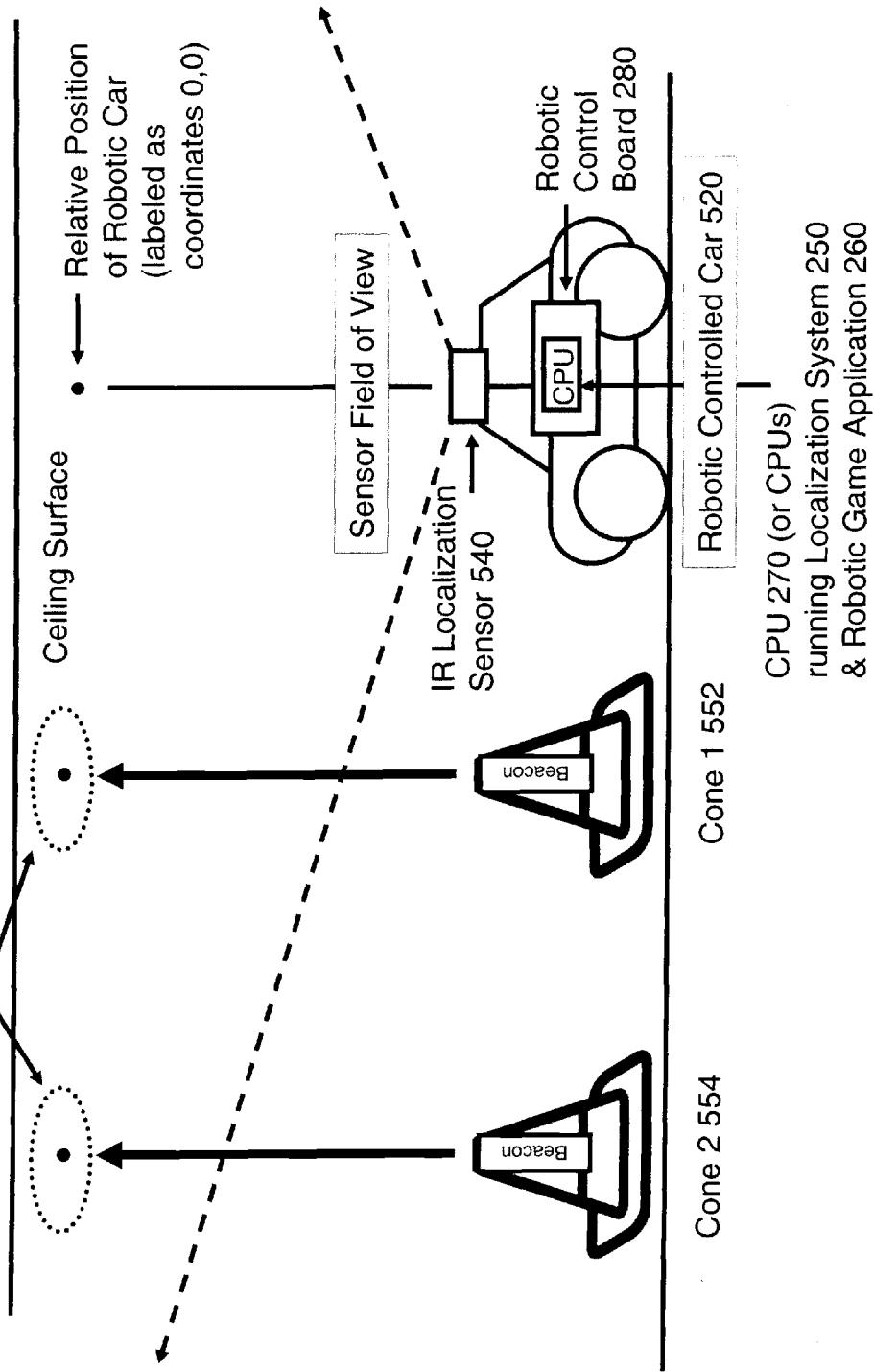

Vehicle Racing System

Outdoor Course Racing

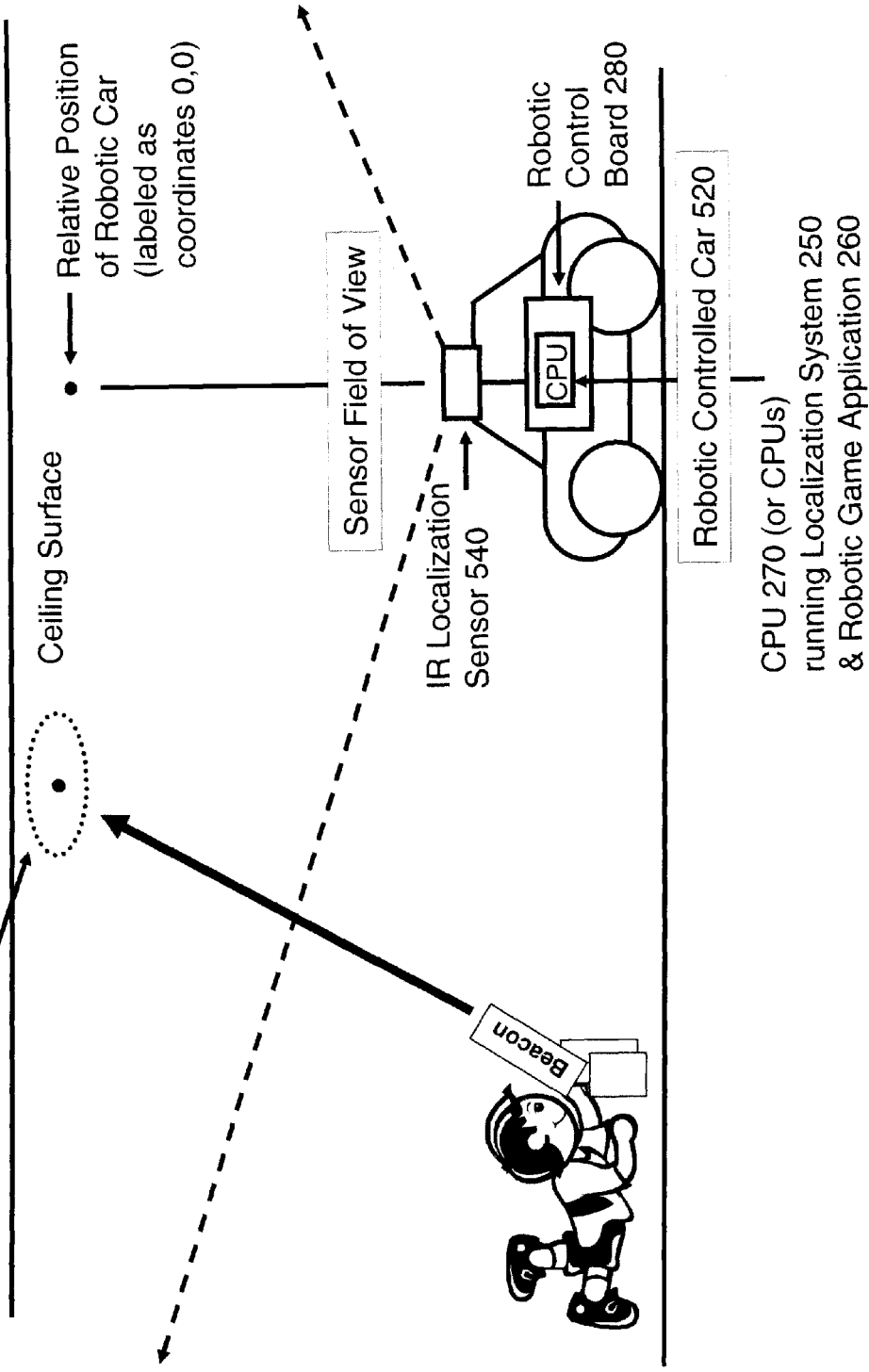
FIGURE 5D: Spot Following

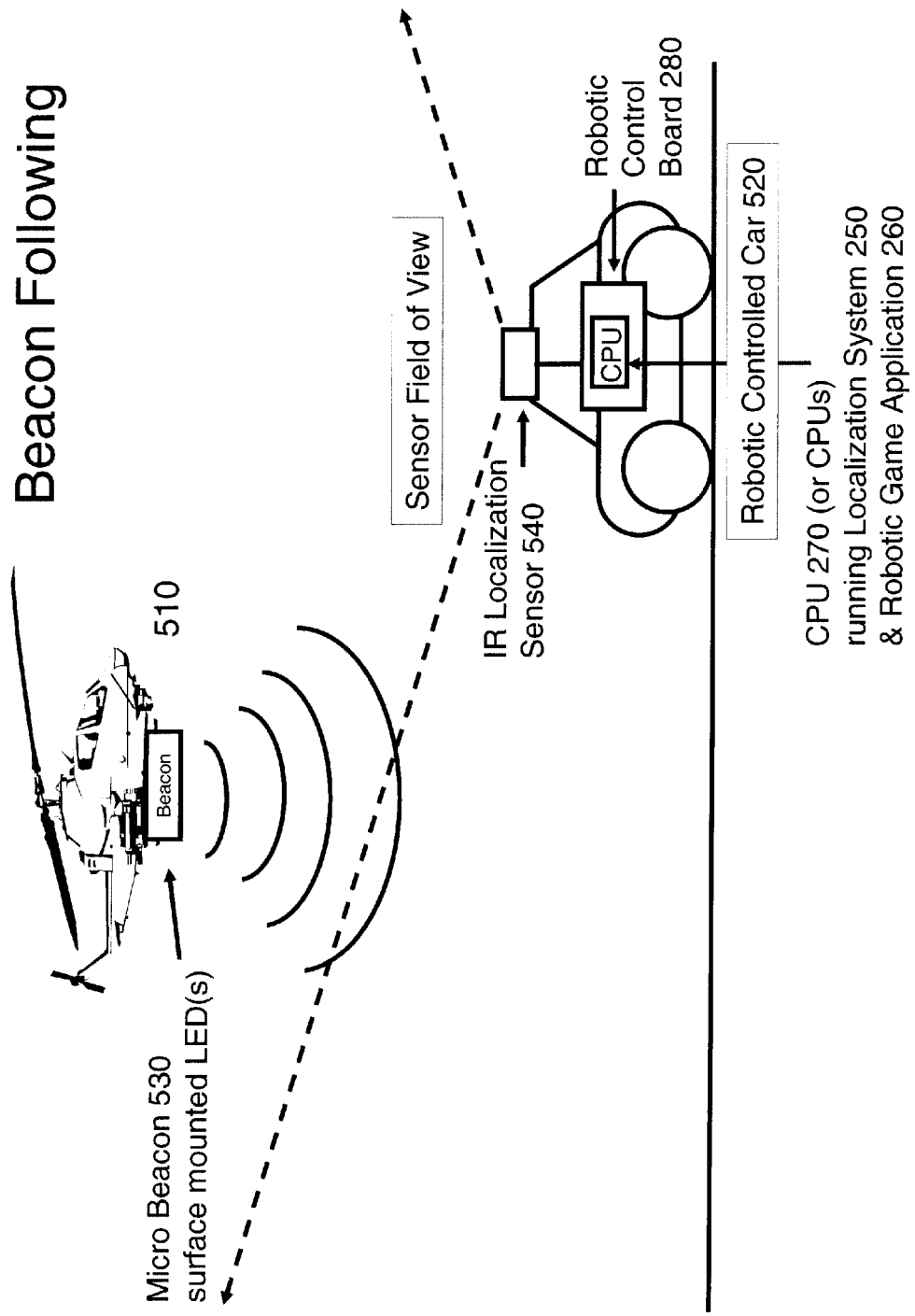
FIGURE 5E: Beacon Following

ROBOTIC GAME SYSTEMS AND METHODS

RELATED APPLICATIONS

This application claims priority to provisional application Ser. No. 60/994,650, filed Sep. 20, 2007.

BACKGROUND OF THE INVENTION

With the evolution of special effects in video games (as well as in other media such as movies and television), consumers are exposed to increasing life-like, and in many cases, surreal experiences that offer increasingly rich and dynamic interactivity. However, one lacking element in video games for many of these experiences is a connection with the physical world. The connection to the physical world does more than stimulate the audience senses and imagination, it actually involve them physically in the game. At the same time, products that have been traditionally provided for physical interaction in an entertainment context, e.g., toys, have become less compelling to a generation of children (as well as adult game players) that are increasingly focused on the digital world.

The Nintendo Wii® provided a major shift in this trend by re-introducing physical play within interactive play, in the context of making games that were more aware of the players' movement as part of the user interface. This approach has been hugely successful, however, it is still limited to games that are mainly represented in a virtual world on a two dimensional screen. Accordingly, a need exists to merge worlds of the video games, toys and physical play in a real-world robotic game system.

BRIEF DESCRIPTION OF THE DRAWINGS

FIG. 4A illustrates an indoor car chasing environment according to an embodiment of the invention;

FIG. 4B illustrates an outdoor line of sight chasing embodiment according to an embodiment of the invention;

FIG. 5A illustrates an embodiment of a car racing game according to an embodiment of the invention;

FIG. 5D illustrates a car racing game application utilizing a handheld projector according to an embodiment of the invention;

FIG. 5E illustrates a car racing game application program utilizing a micro beacon according to an embodiment of the invention.

DETAILED DESCRIPTION OF THE INVENTION

Figure 1:
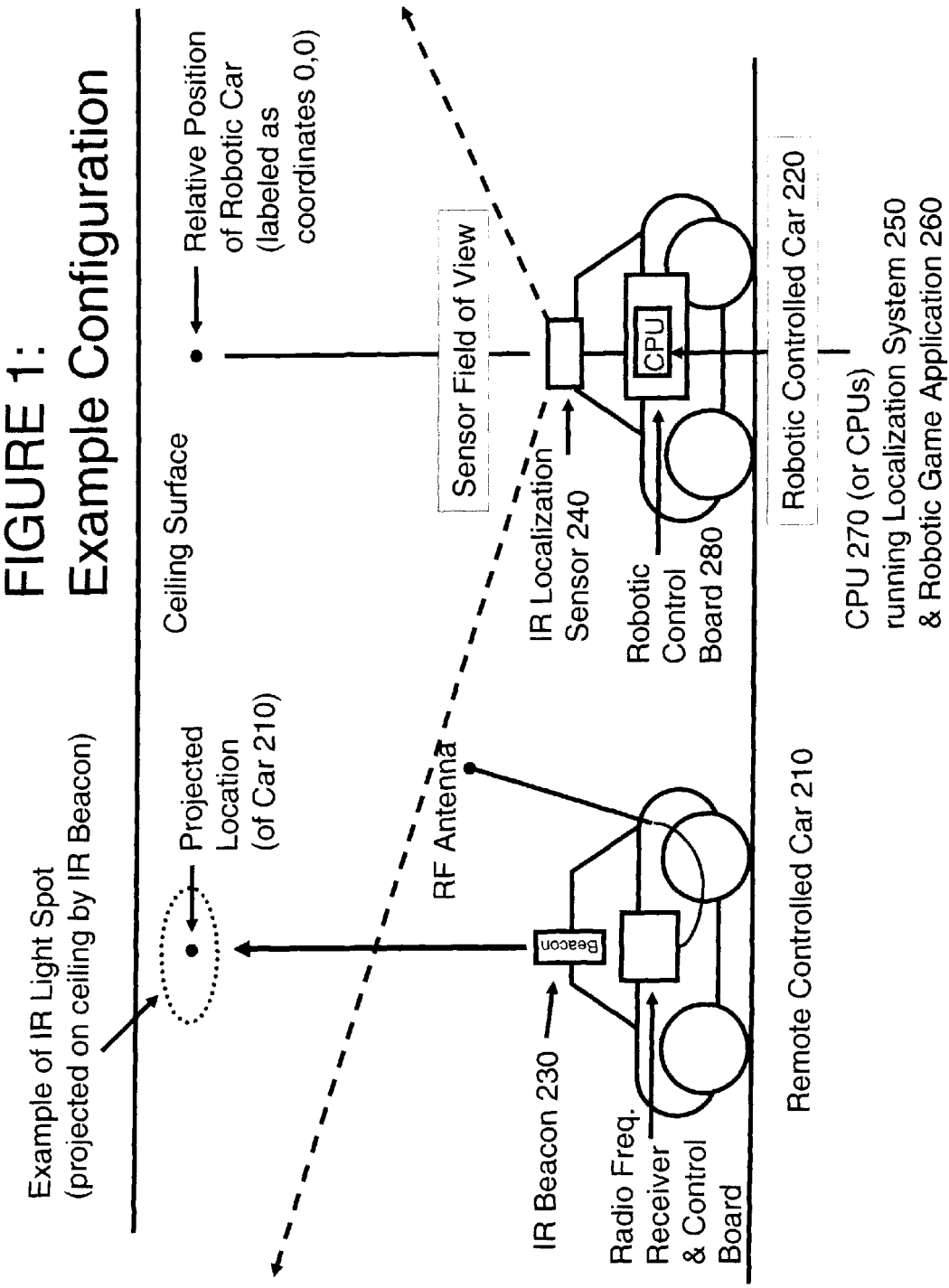
FIG. 1 illustrates a robotic game system environment for a robotic car chasing game including at least two game objects according to an embodiment of the invention.

The goal of this invention is to take game play to a new level, by merging the worlds of video games, toys and physical play in a real-world robotic game system, where the environment of the game literally surrounds the game player, and traditional toys (as well as new ones) come to life with the speed, interactivity and intelligence until now only available on in the virtual worlds.

This specification describes a new class of interactive games. Localization systems, positioning systems and navigation systems are applied for use in robotic enabled games. In this new class of interactive games, one or more key elements of the interactive game play experience are provided through the operation of autonomous or semi-autonomous robots, and/or robotic-enabled devices. The autonomous, semi-autonomous robots or robotic-enabled devices utilize localization systems, programs written to utilize data from the localization systems and other supporting game objects in real world settings to perform game functions and behaviors. The game functions and behaviors may be preprogrammed (i.e., software routines may establish game rules) and the game application program may perform according to game rules and goals and compete effectively against game opponents.

The types of robotic interactive games that utilize autonomous robots, semi-autonomous robots or robotic-enabled devices may be very diverse. However, each of these robotic interactive games share a common set of functions and capabilities. These shared set of functions and capabilities are linked to the role of the localization system and the interplay of the robotic devices and other game objects utilizing the localization system.

The localization system provides the position and/or identification of at least one game object relative to at least one other game object. The localization system may also provide the position and/or identification of at least one game object relative to an established boundary. The position information may be provided either as heading information, distance information, coordinate position information, orientation information, motion information and/or 3D location in space information.

The change in position of at least one game object is a key element of the game play. The change in position information is connected tightly to the goals for winning the game, the calculation of the game score, determining behavior and/or strategy of game opponents, and/or the rules for playing the game.

A game object is any localizable element of the game identified and/or tracked by the localization system in order to support the game play. The game object may be an actual object or a virtual object. Game objects may include, but are not limited to: (1) robotic players; (2) robotic controlled devices; (3) remote controlled players; (4) remote controlled devices; (5) hand held game controllers; (6) game props such as balls, pucks, pins, flags, targets and other items used as part of the game play; (7) human players and/or devices they wear or hold; (8) locations defined by a pointing or aiming device; (9) markers (stationary game objects) that delineate boundaries, zones and/or other relevant coordinates in the game field.

The autonomous or semi-alitonomous functions supported by the localization system may provide core capabilities for a robot or a robotic enabled device. This allows the robot or robotic enable device to operate relative to one or more game objects and compete effectively against other game opponents. The other game opponents may include, but are not limited to: (1) other robots or robotic enabled devices; (2) computer-controlled devices; (3) virtual players; (4) human-controlled devices; or (5) actual humans. The use of additional game objects with relative position information and/or identification provides for expanded game scenarios, more complex rules and/or or advanced functions.

The specific configuration and use of game objects, the localization system and robotic devices varies according to the game. Some games may involve a very minimal configuration while other games may involve multiple systems and complex, tiered processes. In many of the disclosed embodiments of the invention, the game application programs use an infrared-based localization system. One embodiment of this system may use the Evolution Robotics NorthStar® localization system to perform all or parts of the functions for tracking the location of game objects. The NorthStar system is described in U.S. patent application Ser. No. 11/090,621, filed Mar. 25, 2005, titled "Method and Apparatus for Position Estimation Using Reflected Light Sources," which is herein incorporated by reference. However, other methods and devices for localization may also be utilized, including but not limited to: methods and devices that utilize visual pattern recognition, visible light detection, line of sight detection of infrared beacons, laser reflection, odemetery, optical navigation sensing, inertial sensing, thermal detection, motion detection, sound detection, radio wave/frequency detection, obstacle detection, physical contact detection, surface contact detection, proximity detection, magnetic field detection, electrical field detection, or any combination thereof.

The implementation of the navigation system may take a variety of embodiments, and still activate the game functions described in this document. Examples of embodiments of the navigation system include, but are not limited to, the placement of a sensor (or set of sensors/or integrated sensory system) on a game robot or robotic-enabled device. The placement of the sensor allows the game robot or robotic-enabled device to derive relevant position information of other game objects. This approach is used in the game application program described below.

In an embodiment of the invention, the placement of a sensor (or a set of sensors or integrated sensory system) may be on a central game device, which provides position information of one or more game objects. The central game device relays that information and/or sends commands back to one or more robots or robotic-enabled devices. In an embodiment of the invention, the placement of the sensor (or set of sensors or integrated sensory system) is independent of any other device. The data from the sensor (or set of sensors or integrated sensory system) is relayed to one or more game robots, robotics enabled devices, or central game devices.

The game playing may utilize any combination of the above approaches. The game playing may also utilize other methods of reading and reporting position information and/or identification of the game objects. In embodiments of the invention, any use of the above approaches may be integrated with a $3^{rd}$ party game platform or device. For example, video game systems (e.g. Nintendo Wii, X-Box 360, PlayStation 3, etc.), handheld game systems (PSP, Nintendo DS, etc), mobile phones, smart phones, PDAs, mp3 devices, televisions, computers, or Internet enabled game systems (e.g. online games), may incorporate the position information and/or identification of the devices and/or game objects to enhance the play experience.

The sensor or sensors used by the system may be any component, set of components or an integrated system that helps provide the identification and/or any related position information of the various game objects. These sensor components and/or systems may include but are not limited to: (1) infrared sensors; (2) cameras, (3) imagers or other visual sensors; (4) laser range finders or other laser sensors; (5) infrared detectors; (6) wheel encoders or other odemetery sensors; (7) optical navigation sensors; (8) accelerometers, tilt sensors, gyroscopes, or other position or inertial sensors; (9) thermal sensors; (10) motion sensors; (11) microphones, ultrasonic sensors or other sound sensors; (12) radio frequency identification (RFID) sensors or other radio sensors; (13) physical contact sensors; (14) proximity sensors; (15) magnetic sensors; (16) electrical field sensors; or any combination thereof. The system may take the raw reading from the sensors. The sensor or sensors may be referred to as a sensing device. The sensing device in the system may process the raw sensor values. Another part of the system, e.g., a processing device, may process the raw sensor values. Further, the sensing device may process part of the raw sensor values and the processing device may process another part of the raw sensor values. The processing device may be part of a localization system.

In embodiments of the invention, the game objects (robots, cars, models, vehicles, etc.) may include a device, an emitter (e.g. emitting visible light, non-visible light (infrared), audible sound, ultrasonic sound, radio waves, magnetic fields, or other forms of energy), a waveform generator, a reflector, a visual pattern or marking, a material with detectable properties, a moving mechanism, and/or an apparatus that allows the sensors (i.e., sensing devices) to detect the game objects. The sensing (or sensing process) may occur through active and/or passive methods. Active methods of sensing include, but are not limited to, the placement of beacons on the game objects where the beacons emit a signal the sensors can detect and use to derive the identification and/or position information of the game objects. Beacons may include but are not limited to: (1) infrared light emitters; (2) infrared spot projectors; (3) other visible or non-visible light emitters; (4) laser emitters; (5) thermal emitters; (6) sound and sound wave emitters; (7) motion emitters or devices that control the motion of objects; (8) RFID or other radio emitters; (9) magnetic emitters, (10) electric field emitters, or any combination thereof.

Passive methods of sensing (or the sensing process) may involve any approach where the sensors can detect a game object without the need for a signal to originate from the game object. These methods may include, but are not limited to: (1) visual recognition of the object or a pattern on the object; (2) reflected light detection of the object; (3) recognition of the physical shape or construction of the object; (4) recognition of motion of the object or part of the object, or any combination thereof.

An example of a multipurpose game object positioning system using Infrared beacons and sensors is provided as an illustrative embodiment of the invention which supports the examples of game programs and configurations described in this application. This system is compatible with the functions and capabilities of the NorthStar® localization system from Evolution Robotics. This system (or element of the system) may also be provided by through the use of alternative localization and sensory solutions described above.

In an embodiment of the invention, a ceiling of a room (or some surface above a floor) is used to provide a mirror of the location of the physical game objects located in the area below the ceiling. IR beacons are mounted on the game objects to mark the location of the game objects by projecting an IR spot (or spots) onto the ceiling that literally reflects the position of the game objects below. The position of the spots is detected by an IR location sensor (or sensors) placed on one or more game objects and/or game devices, where the sensor is aligned to have a view of the ceiling. In some embodiments, the sensor is either horizontal or near horizontal to have maximum field view of the surrounding ceiling area, as well as to be able to detect when the sensor is directly under a projected spot. Certain game objects (such as a robot game player) which include the IR location sensor (or sensors) may not need to have a projector to determine their own position, as the game object can normalize and/or derive its position in relation to the location of the other game objects tracked by the location sensor.

This system enables devices with a location sensor to construct (utilizing a software program) a real-time map of the game environment and the physical game objects (both mobile and stationary.) In addition, the ceiling provides a physical space for users to interface with the game, game environment and/or game objects, through the use of pointing devices that enable the users to project additional IR spots on the ceiling, which provide the means for a coordinate-based controller to interface with the game. Frequencies of the IR projected spots and/or messaging encoded with the IR signal may be varied to allow the IR location sensor to differentiate the spots, track their position separately, and have a method for uniquely identifying the corresponding game objects.

In an embodiment of the invention, the frequency generated by the beacon or beacons may be changed to provide communication between game objects with projectors and the devices or game objects with sensors. Additional spots may be projected at fixed points on the ceiling independent of the game objects (or in conjunction with certain game objects that mark boundaries or zones of the playing field) to provide a GPS-like coordinate mapping system where the location sensor may triangulate coordinate positions in relation to the fixed spots.

In an embodiment of the invention, the IR localization sensor may detect IR sports projected on surfaces other than the ceiling, such as a wall, item of furniture, person, robot, and/or any object, where the IR localization sensor may still detect the reflected spot within its field of view. As one example, a game player could use a hand held pointing device to "paint a target: on a second game player by projecting the IR spot on the second game player. In certain embodiments, the position and/or orientation of the sensor may be adjusted to provide broader field of view for detecting the reflected on other surfaces. In one embodiment, the sensor may be positioned to provide for detection of objects at a certain minimum height above the surface of the floor.

In an embodiment of the invention, the IR localization sensor may also detect the indirect reflection of one or more projected IR spots (e.g. multipath signal) and utilize the indirect reflection to: (1) identify game objects that are not immediately visible in the field of view and/or where the projected spot or spots from the game object are blocked by some obstacle, (2) estimate the direction and/or position of a game object from the indirect reflection of one or more projected IR spots, and/or (3) facilitate the navigation of a robotic enabled mobile game objects to home in on the beacons signal and move into a position where the sensor can detect a localize on the projected spot. In an embodiment of the invention, the indirect reflection other IR emitting beacons, including line of sight IR beacons as referenced below, may also be used for these types of functions.

In an embodiment of the invention, additional game objects with line of sight beacons may be introduced to the system for versatility, where the sensor, in addition to locating projected spots, may also detect and locate direct IR line of sight signals from devices above the floor level within the field of view of the sensor. The IR signals from devices may include beacon tags worn by users, beacons built into game control devices, beacons built into a tall stationary or mobile structure, as well as beacons built into flying vehicles. In an embodiment of the invention, the sensor may detect a line of sight IR beacon by detecting original light emitted by an IR LED (or LEDs) contained within the IR beacon, a diffused light where the light from an IR LED (or IR LEDs) on an IR beacon passes through a diffusing material, and/or reflected light from an IR LED (or IR LEDs) that is reflected around the immediate area of the IR beacon.

In an embodiment of the invention, the IR localization sensor may be configured to look downward toward the direction the floor from a certain height in order to detect line of sight beacons mounted on mobile and/or stationary game objects on or near the floor surface. One embodiment may include a flying vehicle with an IR localization sensor that chases a ground robot with a beacon, and/or uses stationary IR beacons to guide its flight path.

In another embodiment of the invention, the downward facing IR localization sensor may be part of an independent game device, which relays position of game objects near the floor surface to robotic controlled game objects and/or a central game controller, which directs the movement of one or more of the game objects. An example may include having the independent game control device with the IR localization sensor mounted on the ceiling, on a wall, or on a tall piece of furniture, where the game device tracks the position of radio controlled toys that each have a line of sight IR beacon, and the game device emits radio control signals to direct the motion of one or more of the radio controlled toys.

In one embodiment, the IR localization sensor may be configured for outdoor use, or to support other environments where there is no ceiling or surface above on to which to project. The IR localization sensor may be configured by re-orienting the sensor to have a forward looking field of view, and activating secondary beacons on the game objects (or modifying the existing IR projector) to emit an IR tracking signal in the horizontal direction. The frequency (or messaging within the signal) for the horizontally directed line of sight IR beacons may be set differently from the projected beacon, to allow the localization sensor to determine within which mode to operate (tracking for line of sight or ceiling projection.) The IR localization system may also be combined with other sensors to provide additional data for estimating position and/or provide additionally dimensions of interaction between the game objects, devices, environment and players.

In an illustrative embodiment of the invention, game programs may reside on a modular intelligent device that utilizes a platform architecture and communication protocol. The modular intelligent device's platform architecture and communication protocol allow the intelligent device to interface, control and execute integrated game behaviors and/or other related functions on different devices (such as robots, toys, computers, game systems, machines, sensors, mechanisms, other modular intelligent game devices, and/or other electronic and/or digital products) independent of the different devices' overall electrical, mechanical, functional and physical configuration. The game program or application programs may be implemented in software, hardware, an ASIC, a ROM, a flash memory, or other suitable memory devices.

The platform architecture and communication protocol provide a systematic division in functions. In an embodiment of the invention, the intelligent device may operate as a "portable brain" that can be detachably connected to a variety of "bodies" (devices) to add intelligence, transfer knowledge and integrate additional functions, capabilities and/or behaviors to the devices' existing functions. The "portable brain" may also be referred to as an intelligent control device or a transferable intelligent control device.

The intelligent control device may provide the key functions for playing the games, which can include but are not limited to: (1) localizing and/or identifying game objects; (2) performing other sensory functions related to the game, such as monitoring the speed of a game object, or if a game object has made physical contact with an obstacle or another game object; (3) communicating between game devices, video game systems and/or other devices that host games, game controllers, and/or other game related devices; (4) executing behaviors, strategies and tactics related to the game; (5) learning from the games played regarding patterns of other game players; (6) identifying and implementing successful strategies, behaviors, and/or tactics, and/or other adaptations; (7) gathering information regarding the game environment, game objects and/or other conditions; (8) sending commands and/or controlling connected products, devices and/or mechanisms to interact as part of the physical game experience; (9) sending commands and/or controlling virtual games objects, such as the representation of characters, objects and other elements within a video game; (10) providing user interfaces for interacting with the game; and (11) supporting other game functions, such as keeping score, keeping track of game progress or level, or maintaining user preferences ; or any combination thereof. The intelligent control device may be located in one of the game objects, e.g., a robotic car, a robot, a console, or a transferable intelligent control device.

The intelligent device architecture may also provide for electronic transfers (such as through software, data files, binary code, and/or other data structures) in knowledge, functions, capabilities, settings and/or behaviors between different intelligent game devices and/or other products, software programs and/or applications compatible with the intelligent game device's architecture, protocols, and/or components thereof.

Game players may use various means to update the games, functions, capabilities, settings and behaviors, which include, but are not limited to: (1) interfacing with the device through its user interface and/or the interface of a connected device; (2) downloading data through wired and/or wireless connection from another intelligent device, computer, video game system, internet server, handheld game unit, mobile phone, mp3 or other media device; (3) uploading data stored in memory on a specific game robot, toy, or other product; (4) loading data from a memory card and/or other storage media through direct connection with the game device and/or via a connection with other device; (5) editing, creating, training and or sharing their own games, functions, capabilities and/or behaviors; or any combination thereof.

In an embodiment of the invention, all or part of the intelligent game functionality may be embedded as part of a game robot, toy, and/or robotic enabled device. In other words, all or part of the game functions described for the modular intelligent device may be provided by hardware and/or software built directly into the game robot, toy and/or robotic enabled device.

In an embodiment of the invention, all or part of the intelligent game functionality may be provided by another platform or device, such as a video game platform, a handheld game device, a computer, an Internet server, a mobile phone, a PDA, an mp3 player or other media device, a television, another electronic device, and/or any combination thereof. In other words, the platform or device provides the hardware and/or runs the software program needed to perform all or part of the game functions described for the modular intelligent device. In certain configurations, the platform or device may utilize additional hardware (such as a peripheral device or devices) connected to the platform or device to provide supplemental functions required for operation of the game, such as sensory, communication and/or control functions. In an illustrative embodiment of the invention, a robotic game system may include a video game console running the primary software of the game and enabling the user interface through connection with game controllers, television and/or display screen, a peripheral device connected to the game console that includes a sensory system for tracking the location of the game objects (mobile and/or stationary), a peripheral device connected to the game system that communicates with robotic enabled-game objects that respond to commands sent by the game console through the communication peripheral device.

The robotic game system provides a number of possible features and variations to the game experience for the end user. Common options for features include, but are not limited to: (1) automatic score keeping; (2) setting difficulty levels and auto-adjustment based on user performance; (3) customizing computer/robot controlled behaviors, and/or game techniques through selection of different profiles or individual settings; (4) coordinating team behaviors performed by a number of robots, robotic controlled devices, and/or virtual opponents; (5) enabling the end-user to have hybrid control, where the user can use a remote control device to send higher level commands for computer/robot to execute; (6) unlocking new games, functions and more powerful behaviors based on performance; (7) providing intelligence so that computer/robot controlled devices may learn from play (e.g. methods that are more successful in competition); (8) training, through a user or artificial intelligence, the game robot, robotic controlled devices, and/or virtual players; (9) learning, incorporating and repeating player actions; (10) interacting with a variety of "game players"—where beacons or tags or other means can be used to enable robots to detect and interact with objects, remote control devices, other robotics and/or human players; and (11) customizing, creating and/or sharing games, game elements, strategies, tactics, behaviors and/or other relevant game functions.

A number of robotic game application programs may be implemented utilizing the robotic game system described above. In an embodiment of the invention, the robotic game system may be a car chasing game application program. In the car chasing game application program, a player drives a remote controlled car and the remote controlled car is chased by a robotic controlled car. Both the robotic controlled car and the remote controlled car are game objects. The robotic controlled car has the car chasing game application program installed in a memory or other storage device inside the robotic controlled car.

FIG. 1 illustrates a robotic game system environment for a robotic car chasing game including at least two game objects according to an embodiment of the invention. The robotic car chasing game includes a first game object 210 and a second game object 220. The first game object 210 may be a remote control car operated by a human game player. The first game object may be tagged with an infrared beacon 230. The infrared beacon 230 may project one or more spots on a ceiling in the environment in which the game is being played. In an embodiment of the invention, the beacon 230 may project one or more spots directly above the location of the game object 210 to indicate its position. In a further embodiment of the invention, the beacon 230 may project one or more spots along an axis in relation to the first positioning spot that indicates the game object's 210 orientation, such as by having a spot projected forward and at an angle to appear in directly front of the game object 210. In an embodiment of the invention, multiple spots may be projected in a variety of locations, where the spots may not necessarily be directly above the game object 210, but the mid-point between the spots indicates the location of the game object 210, and/or the arrangement of the spots is fixed so that the orientation of the game object 210 can be derived (as one example, in a triangle pattern pointing in the same direction of the game object 210.) In an outdoor environment, the infrared beacon may project one or more spots on a covering over a location in the outdoor environment where the car chasing game may be played.

Figure 2:
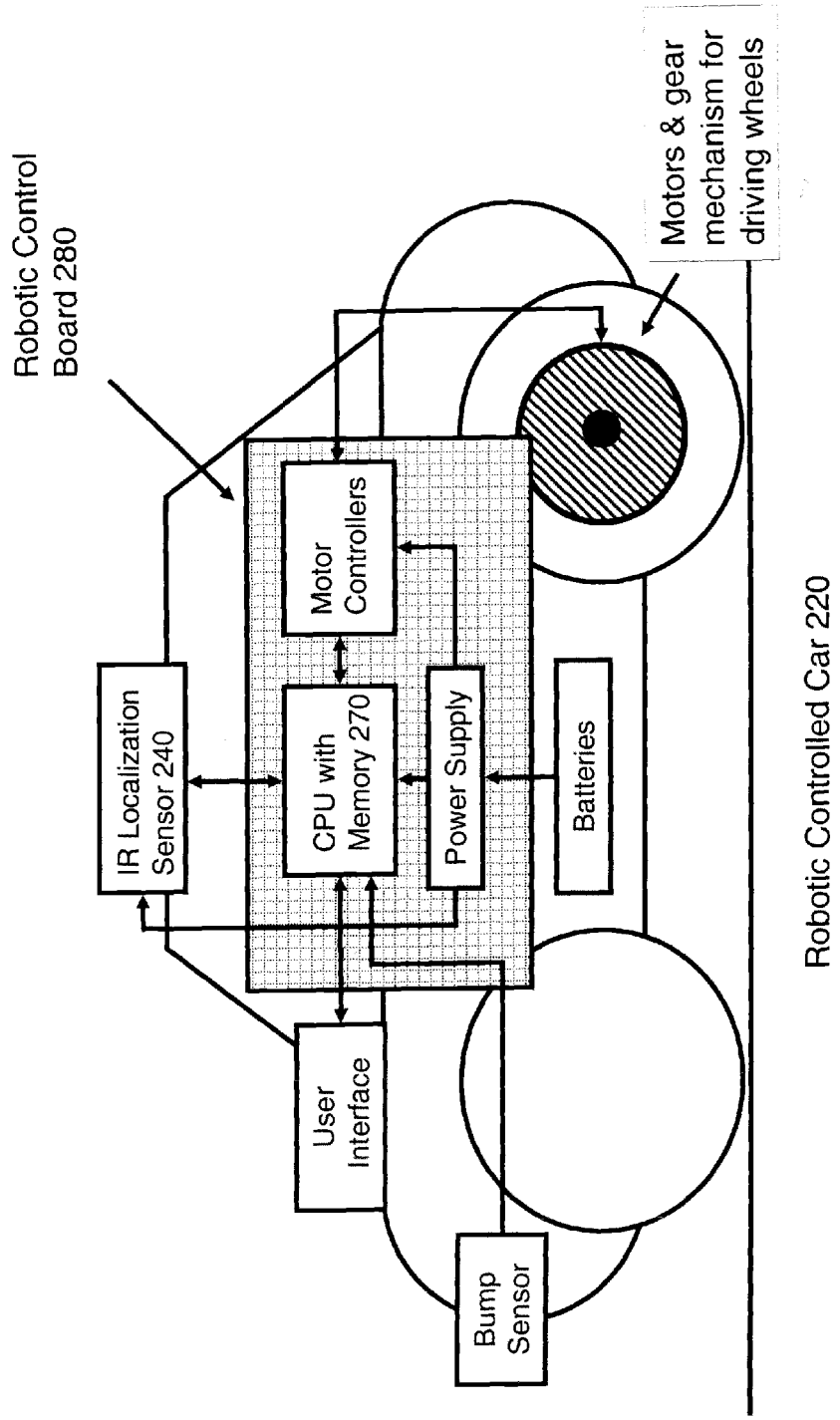
FIG. 2 illustrates a block diagram of a robotic controlled car according to an embodiment of the invention.

FIG. 2 illustrates a block diagram of a robotic controlled car according to an embodiment of the invention. The second game object 220 may be an autonomous car, or in other embodiments may be a semi-autonomous car. The second game object 220 may be equipped with a localization sensor 240 and a robotic control board 280, that among other functions, may include a localization system 250 (module) that runs on one or more CPUs 290 which may be connected to and/or communicates with the localization sensor 240. The localization system 250 utilizes the localization sensor 240 to detect a position, orientation and distance relative to the projected location of the first game object 210. In this embodiment of the invention, the projected location is provided from the infrared beacon 230, which may project one or more spots above the first game 210.

In this embodiment of the invention (or game playing scenario), the location of the first game object 210 is the reference point. The localization system 250 may label the coordinates for the second game object 220 as 0,0 (the center of the chasing car's game environment). In an embodiment, any coordinate values for the chasing car's 210 position may be used. The localization system 250 determines the position of the first game object 210 in relation to the second game object 220 utilizing the beacon 230 and the localization sensor 240. The second game object may include the car chasing game application program 260, which may run on the CPU 270 (or CPUs) on the robot control board (280.) The second game object 220 may also include necessary processing, electrical and/or mechanical systems for running game behaviors and executing those behaviors in the physical environment.

Figure 3:
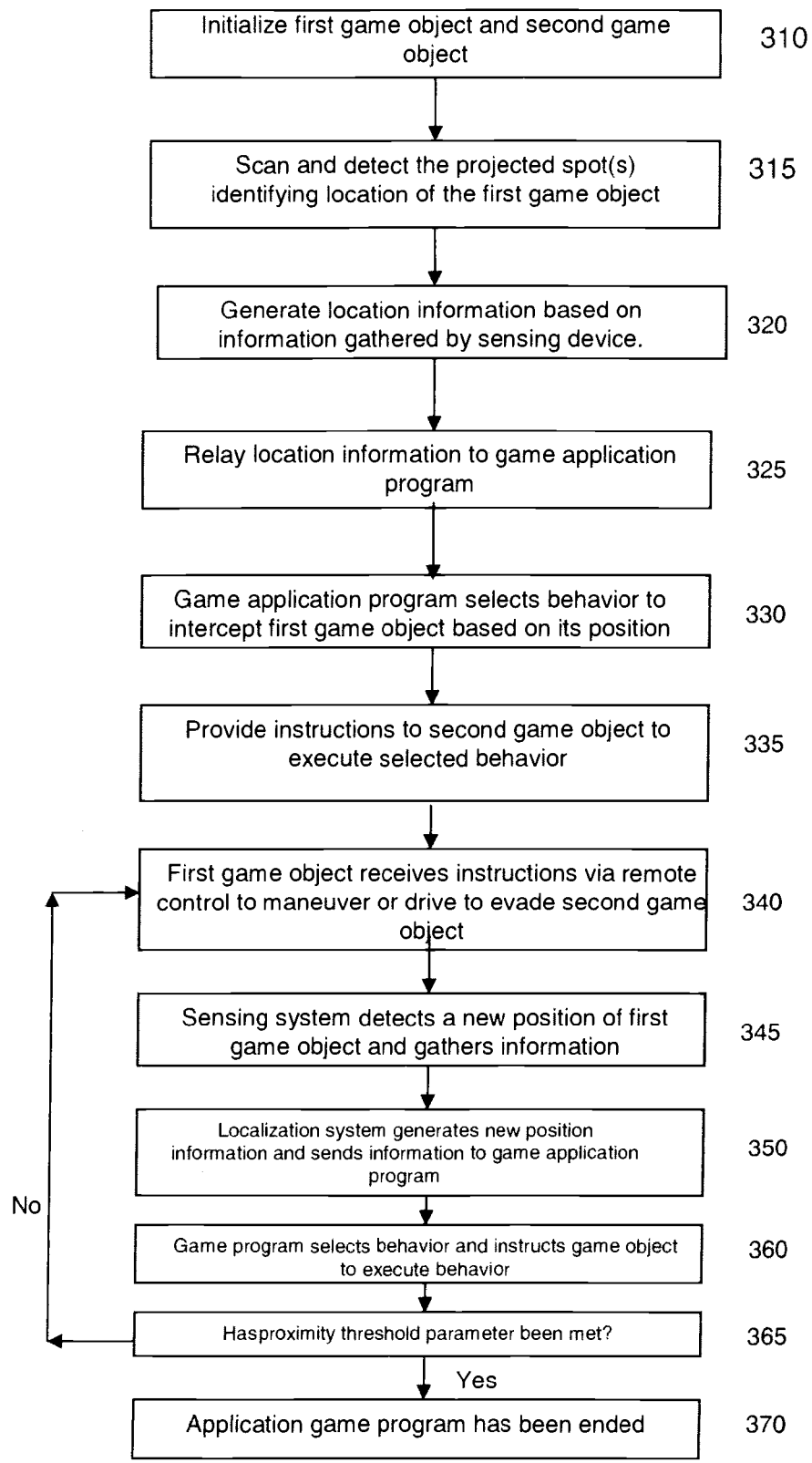
FIG. 3 illustrates a method of a robotic car game chasing application according to an embodiment of the invention.

FIG. 3 illustrates a method of a robotic car game chasing application according to an embodiment of the invention. The first game object 210 is initialized and the second game object 220 is initialized 310. The localization system 250 on the autonomous car (second game object) 220 scans for and detects 315 the projected infrared spot using the sensor system 240 of the second game object 220. The localization system 250 generates 320 a position of the first game object 210 based on the information from the sensor system 240. The localization system 250 relays 325 the position to the car chasing game application program 260 running on the autonomous car's (second game object's 220) CPU 270.

The game application program 260 selects 330 a behavior (or behaviors) based on the position of the first game object 210 where the goal of the behavior (or behaviors) is to drive the second game object 220 to in a way to intercept the first game object 210. The car chasing game application program 260 sends instructions 335 to the second game object's mechanical and electrical systems to execute the selected behavior (or behaviors.) In an illustrative example, the second game object 220 detects the first game object 210 at a first distance and the behavior selected (by the game application program) is a direct line of pursuit at a maximum velocity. The game application program 260 commands 335 (or provides instructions to) the robotic car (the second game object 220) to turn to the direction of first game object 210 and drive forward at a full speed.

In response, the first game object 210 may receive instructions 340 to maneuver or drive the first game object in an attempt to evade the second game object 220. In an embodiment of the invention, a player may be in control of the first game object 210 and may provide the instructions via a remote control device. The first game object 210 maneuvers or drives according to the received instructions. The sensing system 240 on the second game object 220 detects 345 a shift in a relative position and/or direction (as compared to the first game object 210), the localization system 250 generates 350 a new position and relative direction of the first game object based on the shift and passes this information onto the game application program 260. The game application program selects a behavior based (or behaviors) on the new position and relative direction and provides instructions such that the second game object executes 360 the selected behavior (or behaviors.)

The game application identifies 365 if a threshold parameter has been met, i.e., has a certain time elapsed, have a certain number of points been obtained, has the second game object gotten within a certain proximity of the first game object for a certain number of times or a net amount of time, has the first game object only been touched a certain number of times, or a combination of conditions, according to the rules of the car chasing game and settings. If the threshold parameter has been met, the car chasing game application program ends 370 the games and the first game object and the second game object are deactivated. In an embodiment, the first game object may be manually be deactivated by the user. If the threshold parameter has not been met, the game application program proceeds to step 340 and repeats the steps 340-360.

Figure 4:
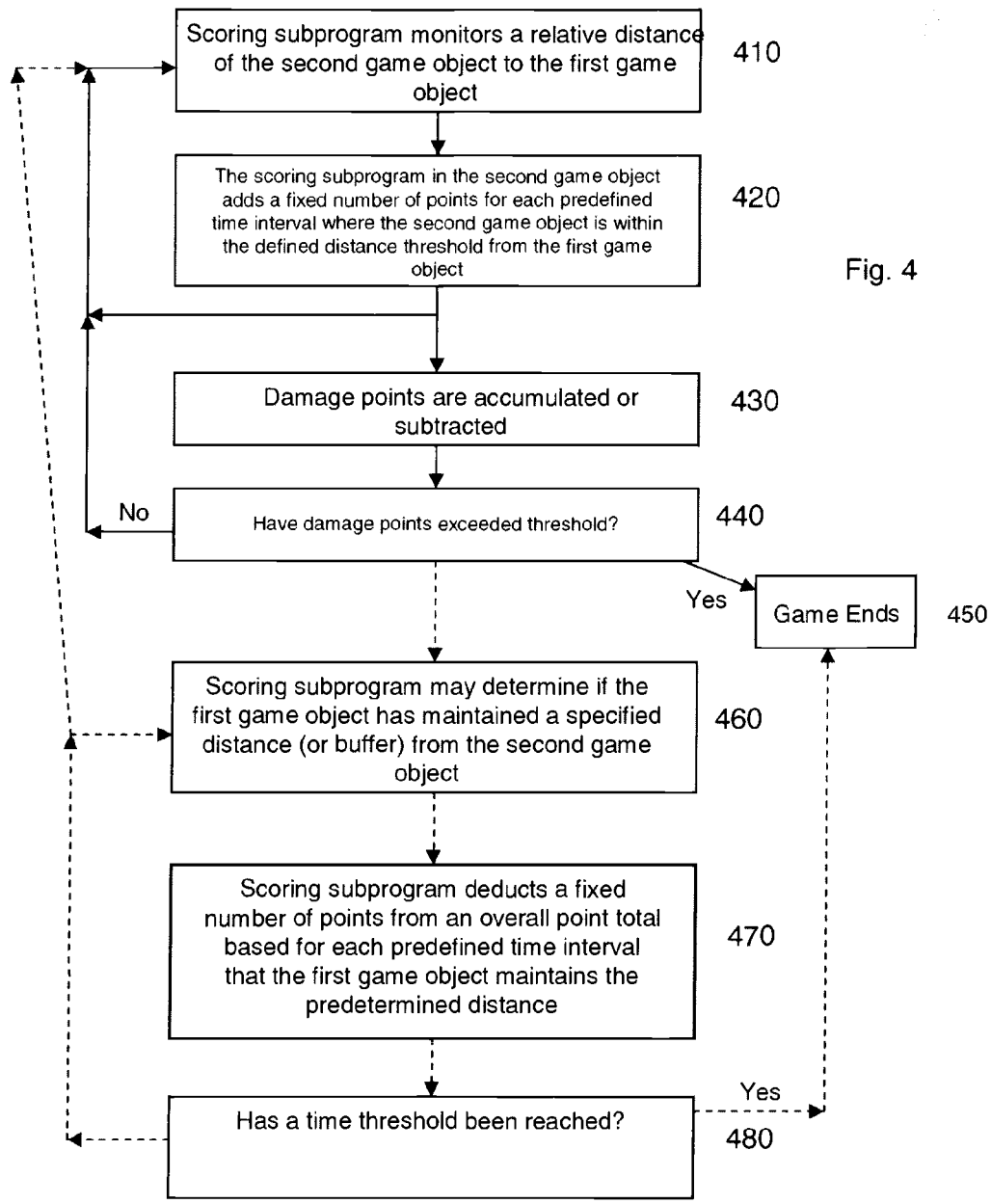
FIG. 4 illustrates operation of a scoring subprogram according to an embodiment of the invention.

In an embodiment of the invention, the car chasing game application program is running a parallel process. This may be referred to as a scoring subprogram. FIG. 4 illustrates operation of a scoring subprogram according to an embodiment of the invention. The scoring subprogram is generating a running score for either the first game object 210 or the second game object 220, or both. In this embodiment of the invention, the scoring subprogram monitors 410 a relative distance of the second game object 220 to the first game object 210. The scoring subprogram includes a reference distance that may be defined by the user, e.g., 1 cm, 3 cm, 5 cm or 10 cm, or set automatically. The scoring subprogram in the second game object 220 (e.g., the robotic car) adds 420 a fixed number of points for each predefined time interval where the second game object 220 is within the defined distance threshold from the first game object 210. In an embodiment of the invention, the defined distance is a distance which represents that the second game object 220 and the first game object 210 have made physical contact. These may be referred to as damage points, i.e., representing damage to the first game object 210 because of the contact. In an embodiment of the invention, the second game object may get more points if it stays within the defined distance threshold for a specified time, e.g., 50 points for each five seconds. In an embodiment of the invention, the second game object 220 may only get points for each new time if gets within the defined distance threshold of the first game object after a certain time has expired from the last time it was within the defined distance.

The damage points accumulate 430 over a run time of the game as the scoring subprogram continues to monitor whether the second game object 220 is within the defined distance threshold from the first game object 210. This is represented by the loop in FIG. 4. If the damage points 440 reach a certain damage threshold, (e.g., 500 points or 1000 points), the game ends 450 and the second game object 220 (the robotic car) is declared the winner.

An additional element may or may not be included in the scoring subprogram. The scoring subprogram may determine 460 if the first game object 220 has maintained a specified distance (or buffer) from the second game object 210. If the scoring subprogram determines that the first game object 210 maintains at least the predetermined distance (e.g., 1 meter or more) of distance between it and the second game object 220, the scoring subprogram deducts 470 a fixed number of points (e.g., 15, 25 or 50 points) from an overall point total based for each predefined time interval (e.g., 5 second or 10 second interval) that the first game object 210 maintains the predetermined distance. When combined with the previously mentioned embodiment, the deducting of damage points causes the total points to be reduced based on successful evasion (i.e., the first game object staying away from the second game object).

The game, including the scoring subprogram, may also be ended 480 if a time threshold (2, 5 or 10 minutes) is reached before the damage points threshold (500 or 1000 points) is reached. In an alternative embodiment of the invention, the game may be ended if the user reduces the total points (damage points) to a low point threshold, i.e., 0 points, 25 points, or 50 points. In either of these cases, the user controlled first game object 210 is deemed the winner.

A number of variations may be applied to the above car chasing game in order enrich the game play, e.g., add more features or different programs. These additional variations include, but are not limited to adding behavior subprograms to the car racing game application program stored in the second game object 220 (robot car). For example, illustrative behavior subprograms may be a ramming behavior subprogram or blocking behavior subprogram, either or both of which could be initiated when the second game device 220 gets within a certain distance and/or orientation of the first game object 210.

The second game object 220 may also include an artificial intelligence or learning subprogram which reviews positional and orientation data received about the first game object 210 and identifies patterns of behavior (or movements) of the first game object 210. For example, the artificial intelligence or learning subprogram may identify that the first game object 210 likes to turn in a specific direction (left at a 45 degree angle). The artificial intelligence or learning subprogram may utilize this identified pattern of behavior, make predictions as to future movements of the first game object and provide this information to the second game object 220. The car chasing game application program in the second game object 220 may receive this predictive data and may make provide commands to the electrical/mechanical systems in the second game object 220 to make moves to anticipate the movement of the first game object 210 in order to intercept the first game object.

In an embodiment of the invention, multiple second game objects (e.g., robot cars) may chase or track a single game object (e.g., a remote controlled car). In this embodiment of the invention, the multiple second game objects run the same game application program. Each of the second game objects operate independently of each other. In an embodiment of the invention, the multiple second game objects cars each consider themselves as the only second game object 220 and pursue the first game object (remote controlled car) 210. Each of the car chasing game application programs 270 may also have the scoring subprogram running which keeps track of the scoring of its car against the remote controlled car.

Although these illustrative embodiments of the invention refer to the game application as a car chasing game application program, the above description also can also be applied to other vehicles (motorcycles, boats, trucks, bicycles) and even humanoid robots or other robotic devices.

In an embodiment of the invention, a central game application may run on each of the second game objects 210 which provides coordinated behavior of the second game objects 210 (e.g., multiple chase cars). The central game application program running on each of the second game objects 220 tracks not only the first game object 210, but the central game application program also tracks each of the other multiple second game objects 220 (e.g., it tracks the other second game objects' position and orientation). In this embodiment of the invention, each of the second game objects 220 would need some sort of beacon or transmitter mounted on the car. The central game application program running on each of the second game objects adjusts its position for the second object for maximum coverage in pursuing the first game object, such as in selecting chase positions that result in the second game object cars chasing in certain order or formation, or in selecting positions to cover the side (flanks) of the first game object as blocking maneuvers. In one embodiment, this process for coverage may be implemented through self-organizing behaviors, where one the of the second game object cars chasing selects a behavior based on its position to the first game object, and the detection of this position by the other second game object cars takes priority over current behavior and trigger a subprograms where directs which position they take in the chase.

In an embodiment of the invention, there may be one or more second game objects (i.e., robot cars) which are chasing multiple remote controlled cars. In this embodiment of the invention, each of the first game objects (remote controlled cars) may have a beacon or transmitter installed on or within the car. Each of the second game objects have the same racing car game application program executing in order to track each of the multiple remote controlled cars (as well as the robotic controlled cars). In this embodiment of the invention, a user operating one of the first game objects (i.e., a remote controlled car) may trick the second game objects by moving close to another one of the first game objects and then moving quickly to a different position. This may trick the second game objects to follow the other first game object (i.e., remote controlled car) that the first remote controlled car moved close to.

In an embodiment of the invention, the game application program may include reverse chasing scenarios, where the second game objects (e.g. robot car) attempts to evade the pursuit of the first game object (the remote controlled car), which may be operated by the user.

In an embodiment of the invention, the car chasing game application program may include an enhanced scoring subprogram. In this enhanced scoring subprogram, the first game object (the remote controlled car) is chased as in the first scenario, but the first game object may score points of its own if it intercepts the second game object (the robot car) from behind.

In an embodiment of the invention, a car chasing game application program may also be resident on the first game object. A user who is controlling the first game object (remote controlled cars) may send commands and these commands may trigger semi-autonomous behaviors within the first game object. These semi-autonomous behaviors may cause pre-programmed maneuvers (which are part of the game application program) that use navigation to evade the second game object (the robotic controlled car). In one embodiment, these evasive maneuvers may operate without knowledge of the position of the second game object (the robotic controlled car,) such as if the first game object (the remote controlled car) executed a series of pre-scripted commands. In one embodiment, these evasive maneuvers may utilize some location sensor built into the first game object (the remote controlled) car to enable it to select a behavior based on the location of the second game object. In another embodiment, the second game object (the robotic controlled car) may relay its position to the first game object through some method of communication (such as an RF or IR signal) where the first game object may use that information to select evasive maneuvers based on the position of the second game object, without the need of having a location sensor integrated into the first game object.

In alternative embodiments of the invention, the car chasing game application program may be played in an outdoor chasing environment. In this case, the first game object may utilize a line-of-sight beacon, the second game object may include a navigation sensor or sensors and the second game object also includes the game application program.

FIGS. 4A-4B illustrate a target car and a chase car including localization systems according to an embodiment of the invention. FIGS. 4A-4B illustrate different systems for determining positions of the game objects according to an embodiment of invention. FIG. 4A illustrates an indoor car chasing environment according to an embodiment of the invention. In the embodiment of the invention illustrated in FIG. 4A, the first game object 210 is a target car, the second game object 220 is the chase car, the signal generator 230 is a an IR spot projector and the sensing system 240 is an IR Localization sensor. As is illustrated, the spot projector is mounted on a top of a target car and projects a spot (or multiple spots) in an upwards direction to a ceiling. The spot projector may utilize a lens to focus the projection of the IR light. In an embodiment of the invention, the sensor is mounted on a top surface of the chase car. In an illustrative embodiment, the sensor may detect (i.e., has a field of view) that encompasses approximately 120 degrees of view, including the ceiling (30 degrees off of horizon). This degree of view is only illustrative and the angle of the field of view may be wider or narrower. In other words, the sensor 240 is looking up at the ceiling. The sensor is looking for one or more spots in its field of view in order to begin determining the location of the target car. In this embodiment, the sensor may be placed level on a top surface of the vehicle. In embodiments on the invention, the sensor 240 may be placed at alternative angles (not level) and/or on in different locations of the robotic controlled car 220, as long as enough of the ceiling surface was visible in the field of view required for the game play. In embodiments of the invention, obstructions may be placed in the sensor's 240 field of view to narrow its range for the purposes of the game (e.g. to make it easier to evade the car by creating more blindspots.) In addition, two or more spots could be projected from the spot projector.

FIG. 4B illustrates an outdoor line of sight chasing embodiment according to an embodiment of the invention. In the embodiment of the invention illustrated in FIG. 4B, the first game object 210 is a target car, the second game object 220 is the chase car, the signal generator 230 is a Line of Sight IR Beacon and the sensing system 240 is an IR Localization sensor. In this embodiment of the invention, the IR Beacon 230 emits light in one or more directions from one or more IR LEDs, where the IR light is viewable from other game objects with the sensing system 240 when the game objects are on (or near) the floor of the game environment. In this embodiment of the invention, the sensor may 240 be mounted on a top surface of the chase car (as is illustrated in FIG. 4B) or any location on the chase car where the sensor has a forward view of the area in front of the chase car.

In an embodiment of the invention, the IR Localization Sensor 240 may be movable on the robotic controlled chase car 220 (or on other robotic game objects,) so that its orientation may change for different modes of operation, where one mode may be where the sensor's field of view is orientated toward the ceiling in order to detect spots projected by a beacon from one more or more game objects, and/or where another mode may be where the sensor's field of view is oriented forward to detect line of site beacons directly mounted on other game objects. This allows the sensor to be utilized both with game objects that have a beacon spot projector as well as with game objects that have a line of sight beacon. The position may be manually adjustable by the user and/or may be mechanically and/or electronically adjusted by the robotic controlled chase car's 220 actions and/or control system (or the actions and/or control system of another robotic game object.) In an embodiment of the invention, the IR Localization sensor 240 may have one or more positions where it can both detect projected spots on the ceiling and line of sight beacons on other game objects within its field of view at the same time. In an embodiment of the invention, game objects may have a line of sight beacon and spot projector beacon, or may have a beacon that can operate in either mode, such as through a mechanism that can change the direction and/or focus of the light.

In an embodiment of the invention, the Line of Sight IR Beacon 230 emits a signal which is 360 degrees around the target car 210. In an embodiment of the invention, 4 IR LEDs (e.g., front, back, left and right sides) may be placed on a PCB and aimed at a horizontal angle, where each of the 4 IR LEDs emit a wide angle signal in each direction (e.g., front, back, left and right sides) on one common frequency. In an embodiment of the invention, alternative arrangements of the LEDs may be used for difference coverage patterns to either expand on constrict the visibility of the target car 210. In an embodiment of the invention, the IR LED's may use different frequencies (or messaging with their signals) which are detectable by the IR sensor 240 to provide additional information about the orientation of the target car 210, such as whether the target car 210 is facing away from or toward the robotic controlled car 220.

In an embodiment of the invention, the LED beacon may run on 3-4 AA batteries, or may run directly on the power source of the car. In the embodiment of the invention illustrated in FIG. 4B the sensor is looking (or sensing in a forward direction). In an embodiment of the invention, the sensor is placed on a top surface of the car on a center axis. In other embodiments of the invention, the sensor may be recessed, as long as its field of view is clear, or may be mounted towards the front of the chase car. In one embodiment, the sensor needs to be able to see at least one of the LEDs from the multiple LED beacon. In one embodiment, the sensor may be also able to detect the reflection light from one or more of the LEDs to determine the general direction of the beacon, and then scan for the direct signal (which in some instances may utilize measuring the magnitude of the signal) to localize on the beacon.

A second illustrative embodiment of the robotic game applications is a vehicle racing game application program. The description below refers to a car racing game application program, but as noted above, the same description and disclosure applies to other vehicle racing games, robot racing games or humanoid racing games. FIG. 5A illustrates an embodiment of a car racing game according to an embodiment of the invention. The second game object is the robotic car 520. FIG. 5A does not illustrate a first game object (or remote controlled car). The sensing device 540 is a sensor which is placed on a top surface of robotic car 520, where the placement may be similar to one or more of the embodiments described previously for the placement in FIG. 4A, and/or the modifiable placements described in the context FIG. 4B where the sensing device 540 may be adjusted to be in a place to have projected spots on the ceiling with the sensors field of view.

In an embodiment of the invention, the sensing device 540 lies flat or on a horizontal axis, as illustrated in FIG. 5A. In a specific embodiment, the field of view of the sensor 540 is approximately 120 degrees, or in other words, the field of view is approximately 30 degrees off of horizon. The 120 degree field of view is only illustrative and the degree of view may be narrower or wider. As described above for FIG. 4A, in certain embodiments on the invention, the sensor may be placed at alternative angles (not level) and/or on in different locations of the robotic controlled car 220, as long as enough of the ceiling surface was visible in the field of view required for the game play. In embodiments of the invention, obstructions may be placed in the sensor's field of view to narrow its range for the purposes of the game (e.g. to make it easier to evade the car by creating more blindspots.) In addition, two or more spots could be projected from the spot projector.

Figure 5B:
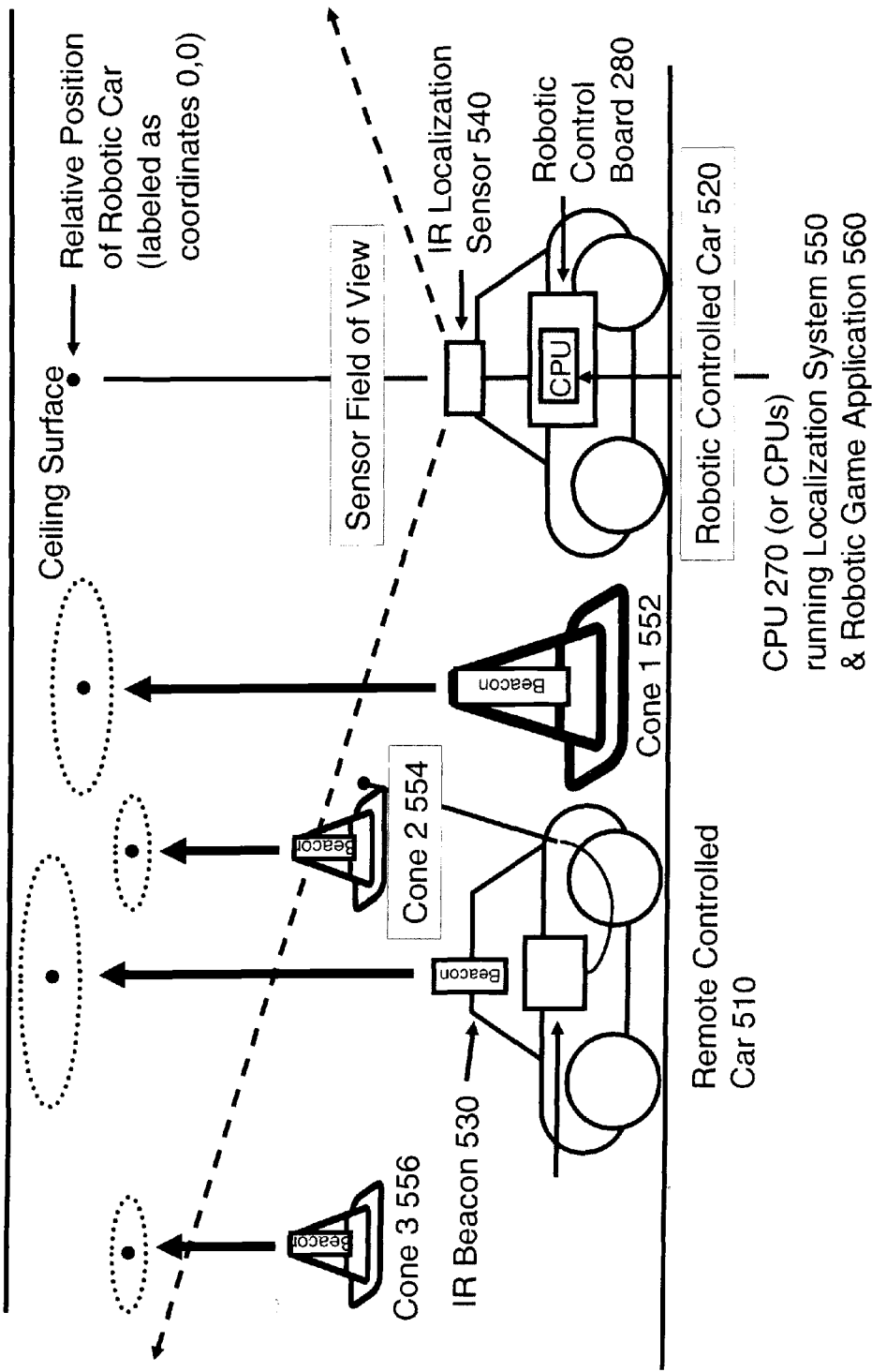
FIG. 5B illustrates an embodiment of a car racing game including a remote controlled car and a robotic car according to an embodiment of the invention.

Two stationary game objects are cones having integrated spot projectors 552 and 554. The projectors may include LED or multiple LEDs (with or without a lens) which points directly up at the ceiling. Each of the integrated cones and spot projectors 552 and 554 broadcast or emit a signal at a different IR frequency to provide a unique means of identification by the IR Sensor 540. In an embodiment of the invention, one or more projectors (or IR beacons on any type) may share a common IR frequency, but utilize an messaging scheme within the IR signal to differentiate each device and/or game object. In the embodiment of the invention illustrated in FIG. 5B, the racing car senses the first spot before sensing the second spot. In an embodiment of the invention, the sensor 540 needs to be flat and there may not be any obstructions in the field of view. FIG. 5B illustrates a car racing program including a remote controlled car and a robotic car according to an embodiment of the invention.

The outline of the racing track for the vehicle racing game application program may be determined by a physical placement of the stationary game objects (e.g., cones) combined with settings that are selected from the vehicle racing game application program running on the second game object (e.g., robotic car). In an embodiment of the invention, the outline of the entire racing track may be defined by a physical placement of the stationary game objects. In an embodiment of the invention, the physical layout of the race track may be customized for a variety of shapes and sizes. In embodiments of the invention, additional game objects (e.g., cones) may be placed to extend the track size and/or to create a more intricate mix of turns, straight-aways and other track segments.

In an embodiment of invention, the vehicle racing game application program may have options for program settings that include, but are not limited to: (1) driving in a clockwise or counter clockwise direction; (2) driving around the additional game objects always to the outside of the track; or (3) running in a specific pattern, e.g., slalom pattern, FIG. 8 pattern, or any other geometric pattern. In an embodiment of the invention, a player directing the first game object (i.e., driving the remote controlled car) may use the stationary game objects as visual landmarks for the path of the racing course. The stationary game objects (cones) may be utilized for a number of features or functions. These features or functions include, but are not limited to: adjusting the layout of the course in real time while the second game object (robotic car) is driven, specifying a sequence to follow from stationary game object to stationary game object (cone to cone); establishing a start line and a finish line; enabling a lap time subroutine on the robotic car to calculate lap times and also to determine when the racing game is over.

In am embodiment of the invention, multiple robotic controlled cars 520 may be placed on the course to race at the same time. The program for each car 520 may be the same or be different based on user input, such as selecting among behaviors that direct how to navigate the course, and whether to use strategies such as driving fast and aggressively, or driving slow and conservatively.

FIG. 5B illustrates a vehicle racing system according to an embodiment of the invention. In the vehicle racing game application program, the first game object (e.g., a remote controlled car) may be driven in a race against the second game object (e.g., a robotic car) in an established or set environment. In this embodiment, there is a first game object 510 (remote controlled car) and a second game object 520 (robotic car). In this embodiment of the invention, the first game object is controlled by a user. The first game object 510 is a tagged with an infrared beacon 530 and it projects a spot or spots onto a ceiling or an upper surface.

The second game object 520 is an autonomous car and is equipped with a localization sensor 540 and a localization system 550. The localization sensor 540 detects a position and direction of the first game object 510 based on the projection of the infrared beacon 530. The localization system 550 receives this information and determines the direction and distance relative to the first game object's 510 projected location. The orientation and distance information may be transferred or sent to the racing car game application program 560.

In this embodiment of the invention, three additional game objects 552 554 556 may also be included in the car racing game system. The three additional game objects 552 554 556 may have infrared beacons that also project a spot (or a plurality of spots) on a ceiling or an overhead surface. Illustratively, the three additional game objects 552 554 556 may be individual cones that project navigation spots on the ceiling (or overhead surface) to provide way points for the robotic car to navigate around the track. An apparatus that is utilized for projecting navigations spots is taught in pending U.S. patent application Ser. No. 11/090,621, filed Mar. 25, 2005, titled "Method and Apparatus for Position Estimation Using Reflected Light Sources which is hereby incorporated by reference herein.

In this embodiment of the invention, each of the beacons emits a unique IR frequency to enable the IR Localization sensor 540 to differentiate and separately track the location of each game object tagged with a beacon. In an embodiment of the invention, one ore more beacons may share a common frequency, but utilize a messaging scheme to different the beacons. Additional game objects with beacons set to other frequencies may be added to expand the game play, which may include additional cones to expand the course, additional remote control cars 510, and/or objects with micro beacons (as illustrated in FIG. 5E) and game control input devices that utilize a projected spot or spots as an interface for controlling one or more robotic vehicles 520.

In this embodiment of the invention, the second game object 520 (robot car) utilizes the additional game objects 552 554 556 to track its position along the race course and as its primary method of navigation. In this embodiment of the invention, the second game object (robot car) may also track the first game object 510 in parallel to determine its place in the race. The second game object 520 also decides which behaviors it will utilize to compete. The additional game objects 552 554 556 may also be referred to as stationary game objects because they are not moving in a number of the game application programs, including the car racing game application program. As noted previously, the second game object (robotic car) includes a game application program, a CPU, electrical systems, and mechanical systems for selecting the game behaviors and executing these behaviors in the physical environment.

In an embodiment of the invention, the user may be able to select different frequencies IDs (or messaging within a frequency) for the different cones 552 554 556 as another means of input to defining the course and/or aspects of the game play. Examples of settings may include whether to pass on the left on the right side of the cone, whether to speed up or slow down, or whether to turn or go forward after passing a cone.

In an embodiment of this invention, additional robotic controlled cars 520 may also be added to the racing system, where the robotic controlled cars 520 may or may not have their own beacon projector (similar to the beacon module 530 on the remote controlled car 510) as a means for additional robotic controlled cars 520 to track their position against one another. This information may be used to select different competitive behaviors within the robotic control cars game application 560 so that the cars respond more dynamically to the their position in the race, such as through adjusting driving speed, attempting blocking and passing maneuvers, and/or executing coordinated behaviors against human controlled remote controlled cars 510. In an embodiment of the invention, users may have hybrid control of the robotic controlled cars 520 as they race along the course, where the robotic controlled cars responded to commands from a user through a standard remote control device, and/or through a beacon device (as shown in FIG. 5D) based on the position of the beacon and/or the frequency and/or messaging signal of the spot or spots projected.

In an alternative embodiment of the invention, the IR Localization Sensor 540 in FIG. 5B may be placed on a separate stationary game device, which monitors the location of game objects tagged with beacons and operates the robotic controlled car 520 remotely. In this approach, the robotic controlled car 520 would instead have an IR Beacon of its own, which enables the IR Localization Sensor 540 on the stationary game device to track the car 520 relative location to the other mobile and stationary game objects. In this model, the IR Localization Sensor 540 monitors the game for a "$3^{rd}$ person perspective," as opposed to the $1^{st}$ person perspective used in the example illustrated in FIG. 5B where the IR sensor 540 is directly integrated on the car 520. In an embodiment of the invention, multiple cars may be tracked and/or controlled in this manner, where the stationary game device may include a central robotic game application that directly controls the behaviors of the robotic cars and/or devices through remote control commands, the stationary game device may relay coordinates to the robotic controlled cars for those cars to execute using their own robotic game application, and/or the stationary game devices relays position information to a $3^{rd}$ device or game platform, which runs the robotic game application and in turn controls the behaviors and movements of the robotic cars.

Figure 6A:
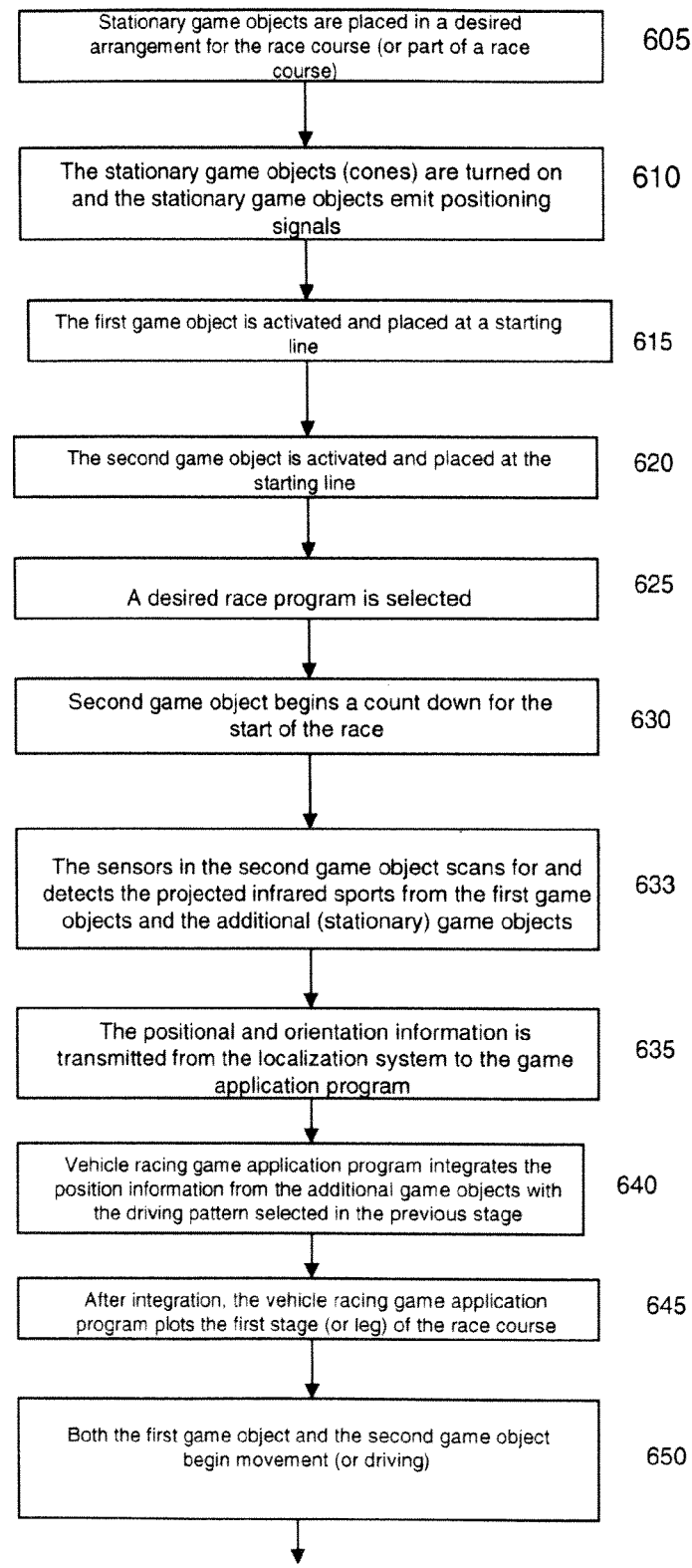
FIGS. 6A and 6B illustrate a method of operating a car racing game application program according to an embodiment of the invention.
Figure 6B:
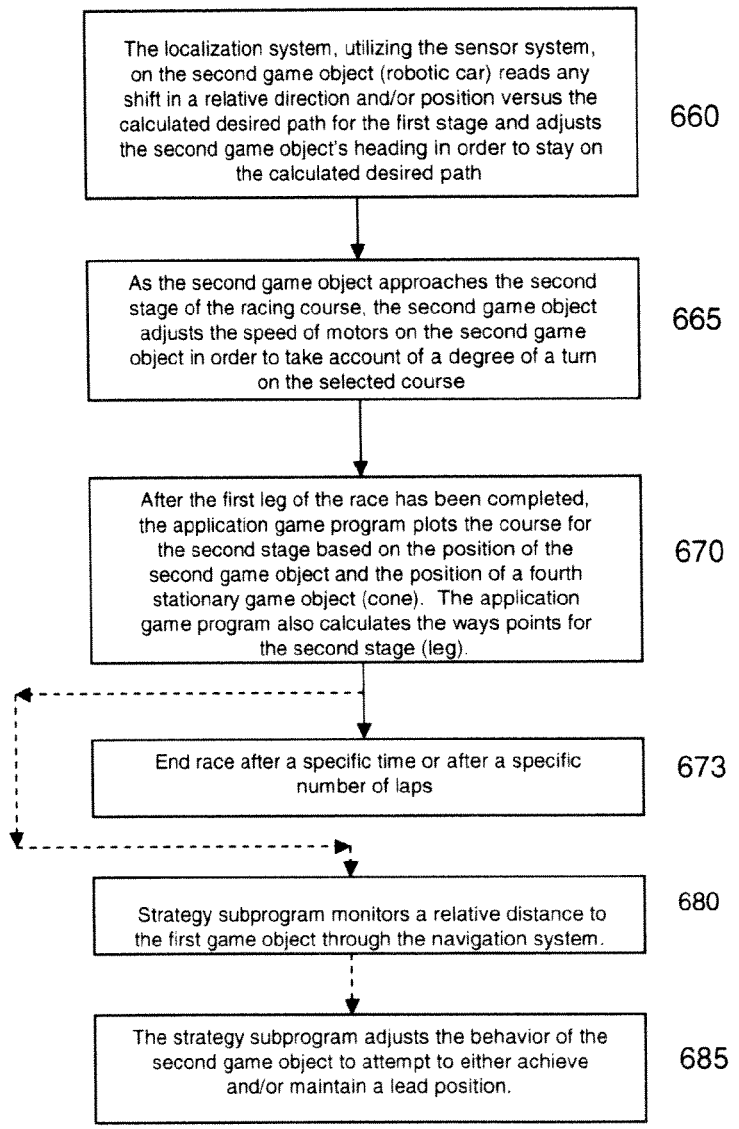

FIGS. 6A and 6B is a method of playing a vehicle race game application according to an embodiment of the invention. Additional game objects (i.e., stationary game objects) are placed 605 in a desired arrangement for the race course. The stationary game objects (cones) are turned on and the stationary game objects emit 610 positioning signals. In an embodiment of the invention, the stationary game objects emit infrared signals and spots appear on a ceiling or an overhead surface. The first game object (remote control car) is activated 615 and placed at a starting line. The second game object (robotic car) is activated 620 and placed at the starting line. A desired race program is selected 625 from the vehicle racing game application program. A count down for the start of the race is initiated 630. In an embodiment of the invention, the second game object (robotic car) begins a count down 630 for the start of the race. In an embodiment of the invention, the count down is an auidible count down, or alternatively, a visible count down. The count down allows a user time to get situated with a remote control. The sensors in the second game object (robotic car) scans for and detects 633 the projected infrared sports from the first game object(s) and the stationary game objects (cones). The localization system in the second game object takes the information from the sensors and determines positional and orientation information. The positional and orientation information is transmitted 635 from the localization system to the vehicle racing game application program. The game application software executes on the second game object's (robotic car's) CPU.

In this embodiment of the invention, the car racing game application program integrates the position information from the additional game objects (cones) 640 with the driving pattern selected in the previous step (or stage). Alternatively, the position information from the stationary (additional) game objects defines the race course. After integration, the car racing application game program plots 645 the first stage (or leg) of the race course. Illustratively, if a third additional game object projects a nearest beam in the direction in which the second game object and the first game object to travel, then the car racing game application program plots a path across a set of way points following the race course for the first stage. The way points may include an endpoint, which is a point near the third additional game object where the first stage intersects with the second stage of the race.

The second game object initiates 650 the start of the race and both the first game object and the second game object begin 655 movement (or driving). The localization system, utilizing the sensor system, on the second game object (robotic car) reads any shift in a relative direction and/or position versus the calculated desired path for the first stage and adjusts 660 the second game object's heading in order to stay on the calculated desired path. As the second game object approaches the second stage (leg) of the racing course, the second game object adjusts 665 the speed of motors on the second game object (robotic car) in order to take account of a degree of a turn on the selected course.

After the first leg of the race has been completed, the car racing game application program plots 670 the course for the second stage based on the position of the second game object and the position of one or more of the stationary game objects (cones). The car racing game application program also calculates the ways points for the second stage (leg). The loop above (steps 650-670) for the car racing game application game program are executed for each of the stages of the car racing.

If the second game object falls off the course at any time, then the second game object drives back to a nearest defined way point for the closest stage and continues on with the car race.

Additional features may be included in the car racing game application program. In an embodiment of the invention, a strategy subprogram monitors 680 a relative distance to the first game object through the navigation system. The strategy subprogram adjusts 685 the behavior of the second game object to attempt to either achieve and/or maintain a lead position. For example, if the second game object is in front of the first game object, as determined by the navigation system, the strategy subprogram adjusts a position of the second game object in a lane in order to attempt to block the first game object from passing it. If the second game object is behind the first game object, the strategy subprogram generates instructions to drive around the first game object. The strategy subprogram tries to not cut in on the inside between way points around a stage.

In an embodiment of the invention, the game application program continues until a set time ends 677. In an alternative embodiment of the invention, the game application program continues until the second game object has completed a set number of laps on the racing of the course.

In an embodiment of the invention, a results subprogram in the car racing game application program in the second game object calculates final standings in the race, identifies the winner and also provides player data on race time and performance.

A number of variations may be made to a car racing game application program. These variations enrich the playing of the car racing game application program. In the car racing game application program, settings of the second game objects may be adjusted to increase or decrease performance. These settings may include, but is not limited to, max speed, acceleration capabilities, braking, and turning response. In addition, other settings may be adjusted for the second game object in the vehicle racing game application. These settings include being fast and aggressive on turns versus being slower or more under control and also pursuing more defensive versus offensive tactics with regard to the first game object (i.e., the robotic controlled car). The car racing game application program may also be modified to include a fuel consumption subprogram which calculates how much fuel the second game object has consumed. The vehicle racing game application program may also be modified to include a pit stop subprogram which includes pit stop and pit times into the vehicle racing game application.

The vehicle racing game application program may also include a course or track customization subprogram. The track customization subprogram may include or activate a number of features. The track customization subprogram may also include a training subprogram. If the training subprogram is activated, the second game object (the robotic car) is moved (or driven) around the course one time or a number of times. The training subprogram in the second game object includes a learning program which works with the navigation system to monitor the second game object's position during the movement through the environment in order to define the customized course. After the customized course is designed, the course is saved into a memory of the second game object (or robotic car).

The course customization subprogram may also receive course information from outside sources. Illustratively, a course may be created (or edited) on a computer, a video game system or other device and downloaded to the second game object into the course customization module (or memory). The course customization subprogram may also receive course information from other users and also from the second game object's previous runs.

In an embodiment of the invention, a course definition subprogram may work with additional game objects for localizing a race course. Illustratively, stationary game objects may be placed across a generic area (e.g., in a triangular or square format) in order to define boundaries in which the race track may be created. The course definition subprogram may utilize the second game object to select, train and edit the course in a manner as discussed above. The actual course layout is selected, trained or edited to be any path that created using the coordinates and area provided. In this embodiment of the invention, the racing course may be entirely based on way points that represent coordinates. In this embodiment of the invention, course legs or phases are not utilized.

In other embodiments of the invention, alternative projection or other localization systems may be utilized to eliminate the use of stationary game objects (cones). As one variation, a single device (or multiple devices) may be used to project multiple spots, where the device may be placed to the side of the course (or at any location) and the spots are projected at an angle of over the desired area of the course. In one embodiment, the location of the spots themselves on the ceiling (or projected surface) may mark course boundaries, waypoints and/or landmarks that the robotic car uses to follow course. In an embodiment, a device (or multiple devices) may be used to project general reference spots, which are used by the robotic cars as triangulation points that provide a fixed coordinate system independent of movement of other the game objects. In this variation, the spots act as GPS-like reference points, and the robotic car may follow courses defined (either pre-programmed, user trained, or learned) as points in the coordinate system. In one embodiment, multiple devices projecting these triangulation points can be placed in adjacent areas to expand the area covered by the coordinate system. Other systems may not use any beacon system at all. Illustratively, a system for navigating, through the use of visual simultaneous localization and mapping (referred to as vSLAM) as is described and disclosed in U.S. patent application Ser. No. 10/739,937, filed Dec. 17, 2003, now U.S. Pat. No. 7,015,831, entitled "Systems and methods for incrementally updating a pose of a mobile device calculated by visual simultaneous localization and mapping techniques," which is hereby incorporated by reference.

In an embodiment of the invention for the racing car example, a learning/intelligence subprogram may monitor and learn behaviors or the first game object. Illustratively, the learning or intelligence subprogram may memorize patterns in the first game object's behavior such as a preference for turning in one direction, speeding up in a certain area of the race track, etc. The learning and intelligence subprogram may then utilize this preference information to make predictions to anticipate moves of the first game object as it maneuvers. The learning and intelligence subprogram may transfer the preference information to the vehicle racing game application program which directs the second device to perform actions in response to the preference information.

In an embodiment of the invention, multiple second game objects (e.g., robot cars) may race on the course at a same time. Each of the second game objects would need to have an infrared beacon that projects a spot on the ceiling. In this embodiment of the invention, each second game object also factors in the position of each other second game objects and the first game object as it attempts to take a lead in the vehicle race and maintain an overall lead position in the vehicle race. In an embodiment of the invention, one or more second game objects (robotic cars) may race against one or more first game objects (remote controlled cars)

In an embodiment of the invention, the car racing game application program may include a team racing subprogram. In this embodiment of the invention, the team racing program places second game objects on a same team and coordinates behaviors between the second game objects. Illustratively, the second game objects may be coordinated through the team racing subprogram to coordinate a blocking behavior against the other teams' game objects and/or to pass the other teams' game objects.

In an embodiment of the invention, the first game objects may include a reduced car racing game application program. This may be referred to as hybrid control (i.e., receiving commands from a user and also executing commands semi-autonomously). In this embodiment of the invention, the first game object may receive commands which trigger semi-autonomous behaviors in the first game object. The semi-autonomous behaviors initiate pre-programmed maneuvers for specific maneuvers. In an embodiment of the invention, the first game object may receive commands to control general navigation over the first game object (remote controlled car) while at the same time allowing the user to control speed and braking. In this embodiment of the invention, the reduced car racing game application program is installed on the first game object. This feature may be especially helpful for younger players.

Figure 5C:
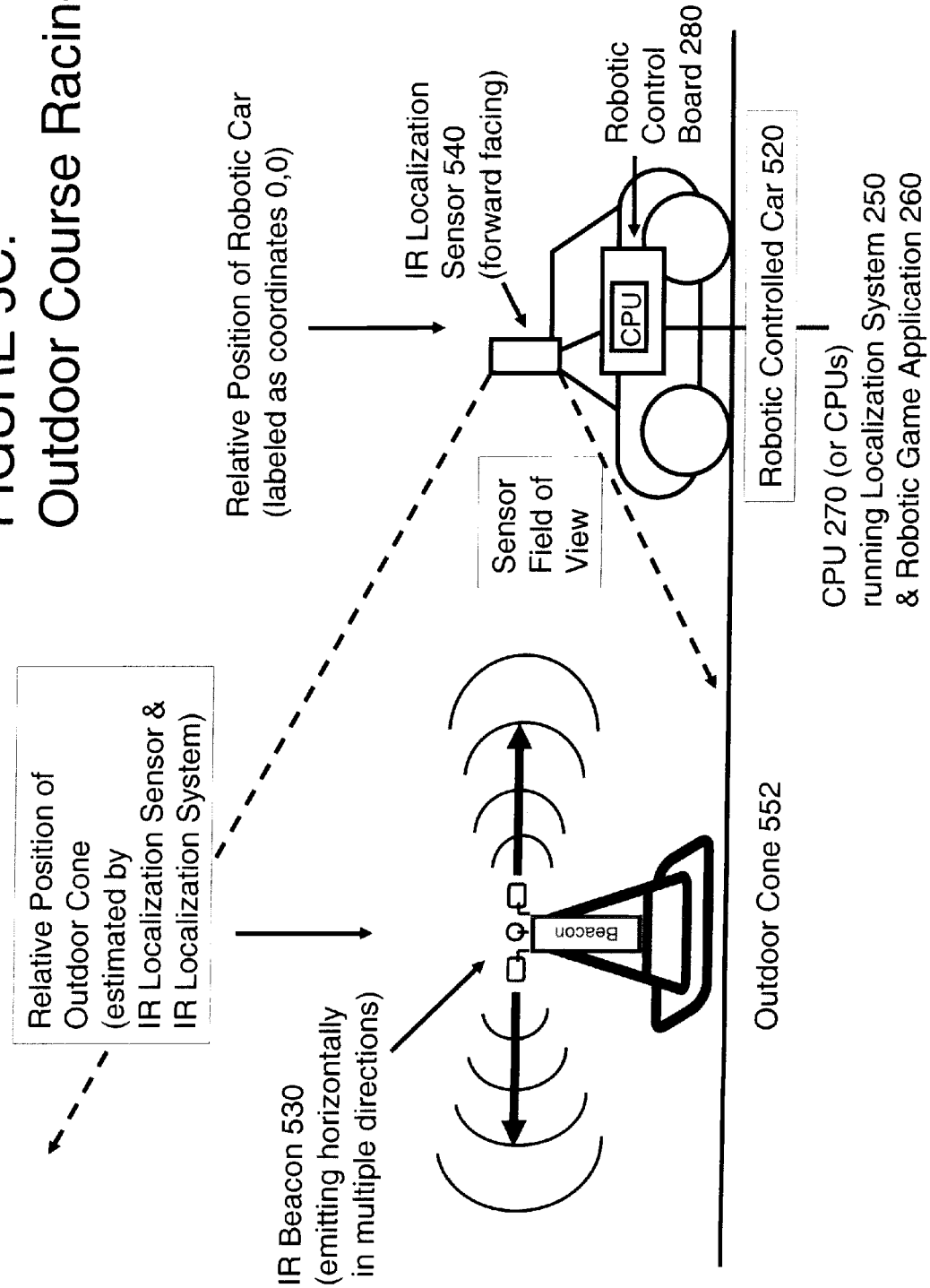
FIG. 5C illustrates a line of sight vehicle racing game application according to an embodiment of the invention.

In an alternative embodiment of the invention, the car racing game application program utilizes navigation sensors and beacons that allow for playing in alternative environments, such as outdoor racing. The navigation sensors and beacons utilize line of sight operation and do not project images onto an overhead surface. FIG. 5C illustrates a line of sight vehicle racing game application according to an embodiment of the invention. In the embodiment of the invention illustrated in FIG. 5C, the second game object 520 is the integrated racing car. The integrated racing car 520 includes a sensing device 540, which in this illustration is a sensor 540 which is placed on its side or such that its field of view points in a forward direction. The field of view is approximately 120 degrees, (which is illustrative and the field of view can be narrower or wider), orientated along the vertical axis the second game object 440. In FIG. 5C, the stationary game object 552 is a cone with an LED Beacon. In an embodiment of the invention, the LED Beacon is a 360 degree beacon which may contain 3 or 4 LEDs. As is illustrated in FIG. 5C, the LED Beacon 552 emits a signal in all directions around the cone. The sensor 540 will sense the signal from the LED Beacon 552 in order to determine a position of the cone in the outdoor environment. Each of the LEDs in the LED Beacon 552 may emit at one frequency. The sensor may be place on a center axis of the car and may be mounted to the front of the racing car 520. The sensor 540 may be recessed, as long as the sensor field of view is clear. In an embodiment of the invention, the sensor 540 may be mounted towards the front of the racing car 520. In this embodiment of the invention, obstacles should be minimized to avoid blocking the sensor 540 from seeing (or sensing) the LED-generated beacon in its field of view. In an embodiment of the invention, multiple cones may be added to expand the course, where each cone is set to its own ID by means of different frequencies and/or messaging within the same frequencies. In an embodiment of the invention, the cone ID provide directions to the robotic controlled car 520 on the course, such as by instruction the car to pass on the right or left, speed up or slow down, and/or drive straight or turn after passing the cone. In an embodiment of the invention, one or more remote controlled car or cars 210 with line of sight IR beacons such as described in support of FIG. 4B. (Outdoor Chasing Game) may be integrated in combination with outdoor cones as described in support of FIG. 5C to have racing games involving both remote controlled and robotic controlled vehicles. In an embodiment of the invention, additional robotic controlled cars 520 may be added to the race, where the robotic controlled cars 520 may or may not have a line of sight beacons included on the car (similar to the line of sight beacon used on the remote controlled car 210 in FIG. 4B) to enable other robotic controlled 520 cars to track their location and adapt their racing behavior.

In an embodiment of the invention, additional sensors may be integrated into the environment. The integration of additional sensors enhances the accuracy of the second game object's position estimation along the vehicle race course. Illustratively, one of many embodiments may include the utilization of an optical navigation sensor, e.g., like a sensor utilized in optical mice. In this embodiment of the invention, the optical navigation sensor is mounted under the second game object. The optical navigation system tracks ground motion and generates ground motion data. The car racing game application program compares the ground motion data to the infrared navigation position data (determined by the navigation system) and refines the position estimate and/or orientation estimate. The comparison may also provide a feedback loop for controlling behaviors, for example, measuring when the second game object has completed a prescribed turn, and/or when the game object is not making progress in its movement because it is physically blocked, and/or providing an alternative estimate of the vehicles position in between areas where the infrared spots are blocked or not available. In one embodiment, alternative sensors for ground motion may be used, which may include wheel odometers which estimate ground movement from the rotations of the wheels across the surface of the floor.

In an alternative embodiment of the invention, the game application program may receive information from alternate devices to control the second game object (robotic car) utilizing the navigation system. These alternative devices may include a handheld projector or other pointing device. These devices may be utilized by a user to direct where a second game object should go, e.g., by pointing the handheld projector or other pointing device at a specific location, rather than only relying on an infrared beacon of a first game object. Illustratively, the handheld projectors or pointing device may be used to drive the second game object (robotic car) entirely manually. At the same time, the vehicle racing game application program and result subprogram may keep track of the second game device's position and score.

FIG. 5D illustrates a car racing game application utilizing a handheld projector according to an embodiment of the invention. In FIG. 5D, the second game object is a race car 520, a sensing device 540 is a sensor and the signal generator 530 is a single spot projector. In this embodiment of the invention, a user may adjust the single spot projector 530 to point at a specific location on a ceiling. As illustrated in FIG. 5D, the sensor is placed on the top of the racing car 520 and can sense a location of the spot and provide instructions to move the racing car 520 to the spot. In an embodiment of the invention, the sensor 540 may be tilted to move forward its field of vision.

FIG. 5E illustrates a vehicle chasing game application program utilizing a micro beacon according to an embodiment of the invention. In FIG. 5E, the second game object is the race car 520 and a sending device is a sensor 540. The signal generator 530 is a micro beacon. The micro beacon 530 may be a small printed circuit board with one or more surface LEDs mounted on the PCB. As illustrated in FIG. 5E, the first game object 510 may be a helicopter. The helicopter 510 may have the micro beacon PCB 530 mounted on a bottom surface or to the bottom of the helicopter. The micro beacon PCB 530 may be a removable module (i.e., a wearable tag) and may emit the signal or beacon in a downward fashion. The micro beacon PCB may run off a small batter and/or a capacitor. The sensor 540 on the racing car 520 may see or sense the signal or beacon from the helicopter in order to identify the position of the helicopter 510. The sensor 540 may gather the location information and transmit this information to the racing car in order to enable selected behaviors. In an embodiment of the invention, the sensor 540 may be tilted forward in order to have a more forward field of view.

The second game device may be used for a hybrid mode, where the second game device is used as a controller for a user to adjust speed and breaking, as well as for providing autonomous specific commands for maneuvers like passing, blocking or ramming through motions or gestures with the second game device.

In an embodiment of the invention, a precision control stunt game application program may also be implemented. In this embodiment of the invention, second game objects (robot controlled cars) navigate obstacle courses, knock over objects and/or jump ramps after being trained on specific driving patterns and behaviors. In this embodiment of the invention, stationary game objects projecting infrared signals (e.g., beacon enabled cones) and course objects may provide locations for the second game object to navigate through. An embodiment may include a jumping ramp that has a beacon placed on either side of the entrance to the ramp mark the location and orientation of entrance of the ramp. Program modules may be selected that set a second game object's behaviors (e.g., specific stunts to execute, how fast to go, which way to navigate around and through the obstacles, etc.). Similarly to the car racing game application program, the precision control stunts game application program may include a course customization module (for customizing a course) and a multi-car module (for multi-car stunts). In addition, the precision control stunt game application program may allow adjustment of performance settings, the use of alternative control devices and also operate the second game objects (robotic cars) in a hybrid mode.

In a battle robot game application program, a first robot may have competitions against a second robot. A navigation system may be used to have robot-vrs.-robot competition. Illustratively, the first robot may battle the second robot in a type of physical contest. One application may be a Sumo robot game application program where the first robot and the second robot attempt to push each other out of a marked ring. Beacon enabled stationary game objects may mark a perimeter of the sumo ring. The first robot and the second robot may have infrared beacons attached and this may allow the navigation system for each of the robots to see the other robots and also to determine its relative position in the sumo ring. Users may participate by programming the first robot and the second robot to complete autonomously against each other by selecting different behaviors and programs. Users can also utilize hybrid controls to execute specific moves and tactics. In addition, users can utilize a remote controlled robot to operate and compete against a robotic wrestler (autonomous competitor). This game application program may also apply to a vehicle based battle, where a set of robotic cars may complete in a demolition derby. The localization system is used by the robotic cars to track and attempt to disable opponent by crashing into each other.

The robotic game technology may also be used in a targeting and shooting game application program. A plurality of robots or devices may utilize the localization capabilities of the system to launch projectiles at targets that it is close with. The targets may be tagged with a beacon or other localization device. The targeting robot may utilize a sensor to detect the targets' position, distance and heading. The information from the sensor is utilized by the navigation system to aim the projectile appropriately. This target information is transmitted to the targeting and shooting game application program. This targeting provides support for a variety of targeting devices and mechanisms, including the use of a pointer or other projecting device to "paint" a target from a distance. When the target is painted from a distance, the targeting robot utilizes its sensors, localization system and the targeting and shooting game application program to cause the targeting robot to file a projectile in the correct position.

In one embodiment, the target function may be combined with a chasing functions, such as a mobile vehicle that has a launching device. The mobile vehicle may chase one or more game objects, and when it is within a certain range of the game object, launch its projectiles in an attempt to hit the target. Embodiments may include where a ground vehicle launches projectiles at another ground vehicle, a ground vehicle launches projectiles at one or more stationary ground targets, a ground vehicle launches projectiles at a person wearing a beacon device, a ground vehicle launches projectiles at a person or target where a projected spot is aimed onto the person or target, a ground vehicle launches projectiles at a vehicle in the air, such as the helicopter in FIG. 5E, and/or an air vehicle chases and launches projectiles at above the above targets. In an embodiment, launching may be combined with navigation functions other than chasing and/or in addition to chasing. One example may be a robotic tank with launcher that patrols a course or area defined by way points, and chases after targets that enter within the area. Another example may be a robotic tank that is programmed on a mission to attack certain designated targets by waypoint location, and may or may not engage in attaching mobile targets and/or engaging defensive maneuvers when mobile targets are detected. Embodiments may include where these games are performed with line of sight beacons and sensor configurations (such as for outdoor games) or where a combination of line of sight and projected beacons are used.

A team or sports game application program may also utilize the robotic game technology. Robots can operate on playing field with varying levels of complexity in terms of types of players, zones within the field and defensive and offensive plays. For example, there may be a capture the flag game application program. The functional elements are similar to the sumo wrestling game application program. Beacon enabled stationary game objects are used to define the boundary of the capture the flag field. Beacon enabled stationary game objects are also used to define the target areas (i.e., the home bases for capturing and retrieving the flags). In this embodiment, the flags may also be tagged with beacons as well, which enables the second game objects (robots) to detect the flags location and movement during the match, utilizing the sensors and localization system. In the basic mode, one remote controlled robot may by operated by a user and compete against an autonomous robot. If an offensive mode, the autonomous robot can utilize the localization system to travel to the flag, retrieve it and attempt to bring it back to the home base. The autonomous robot can also monitor the location of its own flag. If the autonomous robot identifies the its own flag is in danger, the autonomous robot may change to a defensive mode. The autonomous robot may switch to this mode if it sees the flag being moved toward the competitor's home base or if it detects other objects less than a predefined distance from its flag. Additional enhancements may include having multiple robots on each team, having autonomous robots compete head-to-head, the ability to select behaviors and the utilization of the hybrid control mode.

The technology may be utilized for other sports games applications. Illustratively, games like tag, hide and seek, hockey, soccer and bowling may utilize this technology, where the game objects and goals can be enabled with a core set of behaviors and supporting functional devices (i.e., moving game objects and stationary game objects) to configure the game play environment.

In an embodiment of the invention, arcade and video games may also be able to be recreated in the real world environment using a navigation system, a set of game objects and robots. In this embodiment of the invention, game objects in the original video game represented by patterns of pixels on a screen at a specific location can become game objects and robots. An illustrative example is Pong, a pong ball may be an autonomous robot that drives back and forth from one side of a field to the other, following a model established by physics to track its trajectory. The paddles for the Pong game may be remote control vehicles, where the paddles have a beacon to allow the robot ball to detect when it has made contact and turn to travel in the opposite direction, or in the other case, when the user missed the ball and lost a point. In alternative embodiments of the invention, paddles may also be projected on the floor surface, where a visible spot indicates to the user where their paddle was located, while an infrared beacon or reflection provided the game objects for the robotic pong ball to detect. Boundaries may either be physical, or be created by beacons as well.

As a related set of game applications for video games, traditional board games such as checkers, chess, and/or other branded board and prop games (e.g. Monopoly®, Battle-Ship®, Stratego®, etc.) or other games of that class may be made interactive through the integration of a navigation system. Game pieces, board locations and other game elements may be tracked as game objects in the navigation system. A robot and/or robotic enabled device may interact with the objects to play against other players, itself or others.

In am embodiment of the invention, the technology may be utilized in augmented reality. This may be defined as merging elements from a real world game with the capabilities of virtual games. Illustratively, a robot game may include augmented reality where the user can control the robot utilizing their video game system, view what the robot is seeing on a television screen, and have graphical elements overlaid onto the video based on position information provided by the robot's navigation system.

Illustratively, an example includes robot tanks batting in a real world setting. In this embodiment of the invention, a navigation system for a player's tank may determine a location of the opponent tank, as well as the position and heading of the player's tank. Utilizing a video game, the player can see the tank's vantage point broadcast on the video game platform screen. In this embodiment of the invention, the video game may have target information light up over the opponent's tank when it comes into view in the video game screen. In an embodiment of the invention, the player's tank may fire a virtual missile at the opponent's tank and the player may see the missile fly on the video game screen toward the target and have a virtual explosion when it made contact.

In addition, any of the game device objects that utilize remote control may have localization integrated into the device to provide autonomous, semi-autonomous or alternative systems for control. This may be referred to as augmented remote control. Illustratively, in one example, a navigation sensor may be placed on a flying remote control airplane or helicopter. The navigation sensor may be used to help position and guide the vehicle, particularly for functions as staying within a boundary, returning to a home location and landing the vehicle. The same sensor may be provided for alternative control with a pointing device as an alternative means of direct control.

Where weight, form factor or power is an issue, the system can be reversed as described initially in this document to place the beacons (or other locator) on a vehicle and use a sensor enabled device to track its position and relay commands for control.

The system is not limited to playing predefined games. Instead, the users may configure the system for new games and tasks based on their interests. Illustratively, a user may train the robot to travel from one point in a house to another point, for example the kitchen to the family room, and have the robot execute key behaviors based on location, such as grab a soda can from a person and deliver it to another person.

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Neverthe-less, it is understood that various modifications may be made without departing from the spirit and scope of the invention. For example, some of the steps described above may be order independent, and thus can be performed in an order different from that described. Accordingly, other embodiments are within the scope of the following claims.

What is claimed:
1. A game system, comprising:
 a first mobile device comprising a microprocessor, a memory and a light generating device, and configured to project a light beam having a first characteristic on an overhead surface; and a second mobile device comprising a microprocessor, a memory and a sensor, and configured to:
  detect a reflection of the projected light beam having the first characteristic on the overhead surface;
  determine a direction and a distance of the second mobile device in relation to a position of the first mobile device based on the detected reflection; and
  generate movement commands for the second mobile device based in part on the determined direction and distance.

2. The game system of claim 1, further including:
a first stationary game object comprising a light generating device and configured to project a second light beam having a second characteristic onto the overhead surface to define a first position on a race course,
wherein the second mobile device is further configured to:
detect a reflection of the second projected light beam with the second characteristic and
determine a location of the second mobile device on the race course in relation to a position of the first stationary game object, and
generate movement commands for the second mobile device based on the determined location of the second mobile device on the race course with respect to the first stationary game object.

3. The game system of claim 2, further including;
a second stationary game object comprising a light generating device and configured to project a third light beam having a third characteristic onto the overhead surface to define a second position on the race course,
wherein the second stationary game object is further configured to:
detect a reflection of the third projected light beam having the third characteristic;
determine a location of the second mobile device on the race course in relation to a position of the second stationary game object; and
generate movement commands for the second mobile device based on the determined location of the second mobile device on the race course with respect to the second stationary game object.

4. The game system of claim 2, wherein the first stationary game object is configured to generate a first identification code and wherein the second mobile device is configured to:
detect the first identification code; and
generate movement commands for the second mobile device based on the detected first identification code.

5. The game system of claim 2, wherein the second mobile device is configured to:
determine a location of the first mobile device on the race course in relation to a position of the first stationary game object, and
determine a race standing position of the second mobile device in relation to the first mobile game object based on the determined location of first mobile device with respect to first stationary game object.

6. The game system of claim 1, wherein the first mobile device is further configured to:
receive instructions generated by a remote control device; and
generate first mobile device movement commands based on the received remote control instructions.

7. The game system of claim 1, wherein the second mobile device is further configured to:
receive instructions generated by a remote control device; and
generate second mobile device movement commands based on the received remote control instructions.

8. A computer-implemented method for a first mobile device, the first mobile device including a memory, a processor and a sensor, the memory storing computer-readable instructions which when executed by the processor, cause the first mobile device to:
  detect, utilizing a sensor, a reflection of a projected light beam having a first characteristic generated by a second mobile device on an overhead surface;
  determine, utilizing the computer-readable instructions stored in the memory, a direction and a distance of the first mobile device in relation to a position of the second mobile device utilizing the reflection; and
  generate, utilizing the computer-readable instructions stored in the memory, movement commands for the first mobile device based in part on the determined direction and distance.

9. The computer-implemented method of claim 8, further including computer-readable instructions, which when executed by the processor cause the first mobile device to:
  detect, utilizing the sensor, a reflection of a second projected light beam having a second characteristic that was projected by a light generating device of a first stationary game object on the overhead surface, the projected light beam defining a portion of a race course;
  determine, utilizing the computer-readable instructions stored in the memory, a location of the first mobile device on the race course based on the detected reflection of the second projected light beam; and
  generate, utilizing the computer-readable instructions stored in the memory, movement commands for the first mobile device based on the determined location of the first mobile device with respect to the first stationary game object.

10. The computer-implemented method of claim 9, further including computer-readable instructions, which when executed by the processor cause the first mobile device to:
  determine, utilizing the computer-readable instructions stored in the memory, a location of the second mobile device on the race course in relation to a position of the first stationary game object, and
  determine, utilizing the computer-readable instructions stored in the memory, a race standing position of the first mobile device with relation to the second mobile device based on the determined location of second mobile device with respect to the first stationary game object.

11. The computer-implemented method of claim 8, further including computer-readable instructions, which when executed by the processor cause the first mobile device to:
  detect, utilizing the sensor, a reflection of a third projected light beam having a third characteristic that was projected by a light generating device of a second stationary game object on the overhead surface, and the second projected light beam defining a second portion of the race course;
  determine, utilizing the computer-readable instructions stored in the memory, a location of the first mobile device on the race course based on the detected reflection of the third projected light beam; and
  generate, utilizing the computer-readable instructions stored in the memory, movement commands for the first mobile device based on the determined location of the first mobile device with respect to the second stationary game object.

12. The computer-implemented method of claim 8, further including computer-readable instructions, which when executed by the processor cause the first mobile device to:
    receive a first identification code generated by the first stationary game object; and
    generate, utilizing the computer-readable instructions stored in the memory, movement commands for the first mobile device based on the received first identification code.

13. The computer-implemented method of claim 8, further including computer-readable instructions, which when executed by the processor cause the first mobile device to:
    receive, utilizing the computer-readable instructions stored in the memory, instructions generated by an external remote control device; and
    generate, utilizing the computer-readable instructions stored in the memory, movement commands for the first mobile device based on the received remote control instructions.

* * * * *

UNITED STATES PATENT AND TRADEMARK OFFICE
CERTIFICATE OF CORRECTION

PATENT NO. : 8,632,376 B2  
APPLICATION NO. : 12/234565  
DATED : January 21, 2014  
INVENTOR(S) : Dooley et al.

Page 1 of 1

It is certified that error appears in the above-identified patent and that said Letters Patent is hereby corrected as shown below:

On the Title Page

In column 2 (page 2, item 56) at line 24, Under Foreign Patent Documents, change "2011-522079" to --2001-522079--.

In the Specification

In column 2 at line 58, Change "semi-alitonomous" to --semi-autonomous--.

In column 3 at line 20, Change "odemetery," to --odometry,--.

In column 4 at line 1, Change "odemetery" to --odometry--.

In column 16 at line 9, Change "am" to --an--.

In column 18 at line 13, Change "auidible" to --audible--.

In column 25 at line 37, Change "am" to --an--.

In column 26 at line 54, Change "Neverthe-less," to --Nevertheless,--.

Signed and Sealed this  
Twenty-sixth Day of August, 2014

Michelle K. Lee  
*Deputy Director of the United States Patent and Trademark Office*